(12) United States Patent
Woo et al.

(10) Patent No.: US 12,255,287 B2
(45) Date of Patent: Mar. 18, 2025

(54) ELECTROLYTE ADDITIVE FOR SECONDARY BATTERY, PREPARATION METHOD THEREFOR, AND ELECTROLYTE COMPOSITION AND SECONDARY BATTERY, WHICH COMPRISE ADDITIVE

(71) Applicant: FOOSUNG CO., LTD., Hwaseong-si (KR)

(72) Inventors: Byung Won Woo, Ulsan (KR); Soon Hong Park, Busan (KR); Jae Woo Jung, Yangsan-si (KR); Ji Eun Kim, Gyeongsangbuk-do (KR); Sang Moon Lee, Ulsan (KR)

(73) Assignee: FOOSUNG CO., LTD. (KR)

( * ) Notice: Subject to any disclaimer, the term of this patent is extended or adjusted under 35 U.S.C. 154(b) by 635 days.

(21) Appl. No.: 17/613,038

(22) PCT Filed: May 22, 2020

(86) PCT No.: PCT/KR2020/006715
§ 371 (c)(1),
(2) Date: Nov. 19, 2021

(87) PCT Pub. No.: WO2020/235968
PCT Pub. Date: Nov. 26, 2020

(65) Prior Publication Data
US 2022/0223912 A1    Jul. 14, 2022

(30) Foreign Application Priority Data
May 23, 2019   (KR) .................. 10-2019-0060548

(51) Int. Cl.
*H01M 10/0567* (2010.01)
*C07F 9/6574* (2006.01)
(Continued)

(52) U.S. Cl.
CPC ..... *H01M 10/0567* (2013.01); *C07F 9/65742* (2013.01); *C07F 9/65748* (2013.01);
(Continued)

(58) Field of Classification Search
CPC ......... H01M 10/0567; H01M 10/0525; H01M 10/0569; H01M 2300/0025; H01M 4/364;
(Continued)

(56) References Cited

U.S. PATENT DOCUMENTS

2003/0215717 A1* 11/2003 Miyaki .................. H01M 4/42
429/231.95

FOREIGN PATENT DOCUMENTS

| CN | 106252716 A | 12/2016 |
|---|---|---|
| CN | 108822151 A | 11/2018 |

(Continued)

OTHER PUBLICATIONS

International Search Report for PCT/KR2020/006715 mailed Sep. 16, 2020.

*Primary Examiner* — Helen Oi K Conley
(74) *Attorney, Agent, or Firm* — Renaissance IP Law Group LLP

(57) ABSTRACT

According to an embodiment of the present inventive concept, an electrolyte additive represented by the compounds of Chemical Formulas 1 to 4 may be provided. In addition, according to another embodiment of the present inventive concept, a method for preparing an electrolyte additive of the compounds of Chemical Formulas 1 to 4 may be provided, wherein the method for preparing the electrolyte additive includes reacting hexafluorophosphate and 2-monofluoromalonic acid, further adding an HF scavenger to the mixed solution produced by the reaction, and concentrating and drying the reaction solution obtained therefrom.

26 Claims, 8 Drawing Sheets

(51) Int. Cl.
      *H01M 10/0525*    (2010.01)
      *H01M 10/0569*    (2010.01)

(52) U.S. Cl.
      CPC ... *H01M 10/0525* (2013.01); *H01M 10/0569* (2013.01); *H01M 2300/0025* (2013.01)

(58) Field of Classification Search
      CPC ...... H01M 4/386; H01M 4/505; H01M 4/525; H01M 4/587; H01M 10/052; H01M 10/0568; H01M 2300/0028; C07F 9/65742; C07F 9/65748; C07F 9/6568; Y02E 60/10
      See application file for complete search history.

(56) References Cited

FOREIGN PATENT DOCUMENTS

| | | |
|---|---|---|
| CN | 109301330 A | 2/2019 |
| CN | 110858665 A | 3/2020 |
| CN | 111116659 A | 5/2020 |
| JP | 2013249261 A | 12/2013 |
| KR | 20170034313 A | 3/2017 |
| KR | 20190026974 A | 3/2019 |
| WO | 2016002771 A1 | 1/2016 |

\* cited by examiner

ELECTROLYTE ADDITIVE FOR SECONDARY BATTERY, PREPARATION METHOD THEREFOR, AND ELECTROLYTE COMPOSITION AND SECONDARY BATTERY, WHICH COMPRISE ADDITIVE

TECHNICAL FIELD

The present disclosure relates to an electrolyte, and more particularly, to an electrolyte additive for a secondary battery and a secondary battery comprising the same.

BACKGROUND ART

Secondary battery refers to a battery that can be used repeatedly because it can be charged as well as be discharged. A lithium secondary battery, which is a representative secondary battery, works on the principle that lithium ions contained in a cathode active material move to an anode through an electrolyte, and then are inserted into a layered structure of an anode active material (charging), and then lithium ions inserted into the layered structure of the anode active material are returned to a cathode (discharging).

Recently, as demand for a power source for next-generation automobiles and demand for eco-friendly energy have increased, interest in secondary batteries has increased. In particular, there is a high interest in technology for increasing the energy density and extending the life of the secondary battery. In this regard, in order to manufacture a medium- or large-capacity secondary battery, a high-voltage and high-capacity secondary battery may be implemented using a lithium-rich layered oxide as the cathode active material as previously known. In addition, a silicon-based material as well as a carbon-based material can be used as the anode active material to improve the capacity of the battery.

Meanwhile, in a typical lithium secondary battery, a lithium salt dissolved in an organic solvent is used as an electrolyte. The lithium-rich cathode active material can generate oxygen gas during the first charge and create a high-voltage environment, and a serious volume expansion occurs in the silicon-based anode material during repeated charges and discharges to form cracks on the surface of the anode, and eventually, a decomposition reaction of the electrolyte may be caused on the surfaces of the electrodes. As a result, the electrolyte is gradually depleted, the electrochemical performance of the battery is rapidly deteriorated, and a thick film acting as a resistance may be formed on the surface of each electrode. Accordingly, the electrochemical reaction rate of the battery is lowered, and the acidic material (eg, HF, etc.) generated by decomposition of the electrolyte melts each electrode film or damages the cathode active material, so the electrochemical stability of the battery cannot be guaranteed.

DISCLOSURE

Technical Problem

In order to solve the above technical problem, the present inventive concept provides an electrolyte additive for a secondary battery having a low reductive decomposition while protecting a uniform protective film formed on an electrode, a manufacturing method thereof, and an electrolyte including the additive.

The technical problems of the present inventive concept are not limited to the technical problems mentioned above, and other technical problems not mentioned will be clearly understood by those skilled in the art from the following description.

Technical Solution

One embodiment of the present inventive concept provides an electrolyte additive. The electrolyte additive is a compound represented by Chemical Formula 1 or Chemical Formula 2 below:

[Chemical Formula 1]

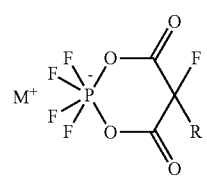

[Chemical Formula 2]

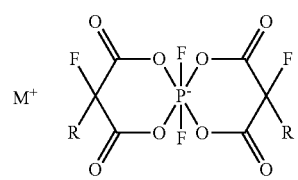

M is alkali metal, and R is hydrogen, a substituted or unsubstituted C1 to C5 alkyl group, a substituted or unsubstituted C1 to C5 perfluoroalkyl group, a substituted or unsubstituted C6 to C30 aryl group, a substituted or unsubstituted C6 to C30 perfluoroaryl group or $CF_3$.

The electrolyte additive of Chemical Formula 1 may be a compound represented by the following Chemical Formula 3:

[Chemical Formula 3]

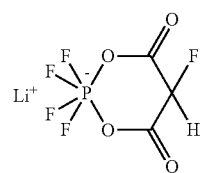

The electrolyte additive of Chemical Formula 2 may be a compound represented by the following Chemical Formula 4:

[Chemical Formula 4]

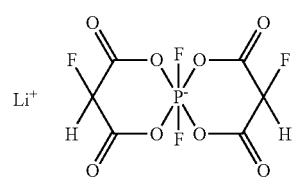

Another embodiment of the present inventive concept provides a method of manufacturing an electrolyte additive, which comprises a step of reacting hexafluorophosphate and 2-monofluoromalonic acid, a step of adding a HF scavenger to a mixed solution produced by the reaction; and a step of concentrating and drying the solution obtained from the above to prepare a compound represented by the Chemical Formula 1 or the Chemical Formula 2.

The hexafluorophosphate may include lithium hexafluorophosphate ($LiPF_6$). The 2-monofluoromalonic acid may include 2-fluoromalonic acid.

The method may further comprise a step of preparing the 2-monofluoromalonic acid by reacting 2-monofluoromalonic acid ester with an acid solution before reacting the compounds. In the step of preparing the 2-monofluoromalonic acid, drying the reaction-completed solution using a dehydrating agent may be further comprised. The dehydrating agent may include orthoesters of $R^1C(OR^2)_3$ in which $R^1$ may be hydrogen or a C1 to C5 alkyl group, $R^2$ may be a C1 to C5 alkyl group, and $R^1$ and $R^2$ may be independently selected.

The step of reacting hexafluorophosphate and 2-monofluoromalonic acid may be performed in a non-aqueous organic solvent. The step of reacting hexafluorophosphate and 2-monofluoromalonic acid may be carried out at a reaction temperature of 5 to 60° C.

The HF scavenger may include a halide, a silane compound, or a combination thereof. The halide may include an alkali metal halide, a silicon halide, a phosphorus halide, or a combination thereof. The halide may include lithium chloride, silicon tetrachloride, dichlorodimethylsilane, chlorotrimethylsilane, phosphorus trichloride, or a combination thereof. The silane compound may include an acyclic silane compound, a cyclic silane compound, or a combination thereof.

The step of concentrating and drying the reaction solution obtained from the above may be performed under reduced pressure.

Still another embodiment of the present inventive concept provides an electrolyte composition. The electrolyte composition may comprise an electrolyte additive represented by the Chemical Formula 1 or the Chemical Formula 2, a non-aqueous organic solvent, and an alkali salt.

The electrolyte additive may be included in an amount of 0.1 to 10% by weight based on the total amount of the electrolyte composition.

The electrolyte additive may be a mixture of the electrolyte additive of Chemical Formula 1 and a coating agent. The coating agent may include fluoroethylene carbonate (FEC), vinylene carbonate (VC), vinylethylene carbonate (VEC), or a combination thereof.

The non-aqueous organic solvent may be a cyclic carbonate, a linear carbonate, or a combination thereof.

The alkali salt may be $MPF_6$, $MAsF_6$, $MCF_3SO_3$, $MN(CF_3SO_2)_2$, $MBF_4$, $MBF_6$, $MSbF_6$, $MN(C_2F_5SO_2)_2$, $MAlO_4$, $MAlCl_4$, $MSO_3CF_3$, $MClO_4$ or a combination thereof, wherein M may be an alkali metal. A concentration of the alkali salt may be 0.1 to 3M.

Still another embodiment of the present inventive concept provides a secondary battery. The secondary battery may comprise a cathode containing a cathode active material, an anode containing an anode active material, an electrolyte containing an electrolyte additive represented by the Chemical Formula 1 or the Chemical Formula 2, and a separator between the cathode and the anode.

The cathode active material may include $LiNi_{0.6}Co_{0.2}Mn_{0.2}O_2$. The cathode active material may include a lithium-rich cathode active material.

The anode active material may include graphite or a silicon-graphite composite.

Advantageous Effects

As described above, according to the embodiments of the present inventive concept, a stability of a secondary battery may be improved by the electrolyte additive. Furthermore, a high voltage and high capacity secondary battery can be realized by simultaneously applying a lithium-rich cathode active material and an anode active material of a graphite/graphite-silicon composite, and even in this case, the improvement of the secondary battery can be improved by using the electrolyte additive.

The technical effects of the present inventive concept are not limited to those mentioned above, and other technical effects not mentioned will be clearly understood by those skilled in the art from the following description.

BRIEF DESCRIPTION OF DRAWINGS

FIG. 5a is a graph showing specific capacity according to the number of cycles, and FIG. 5b is a graph showing coulombic efficiency according to the number of cycles. In addition, FIG. 5c is a graph showing the change in open circuit voltage during high-temperature storage.

FIG. 7a is a graph showing specific capacity according to the number of cycles, and FIG. 7b is a graph showing coulombic efficiency according to the number of cycles.

DETAILED DESCRIPTION

Figure 1:
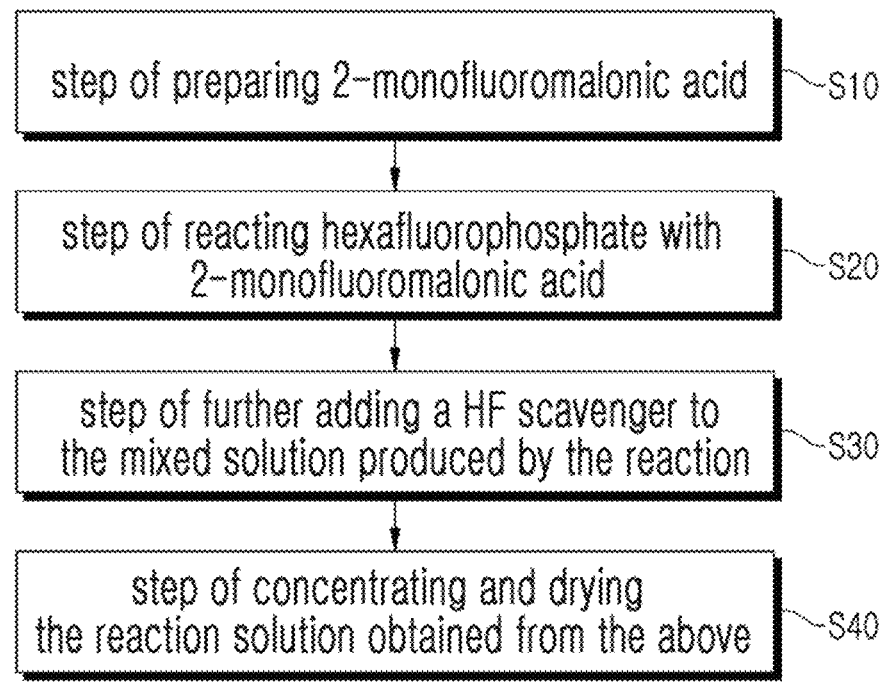
FIG. 1 is a flow chart showing a method of manufacturing an electrolyte additive according to an embodiment of the present inventive concept.

Since the present inventive concepts can have various changes and can have various embodiments, specific embodiments are illustrated in the drawings and described in detail. However, this is not intended to limit the present inventive concept to specific embodiments, and it should be understood that all modifications, equivalents and substitutes included in the spirit and scope of the present inventive concept are included.

The terms used in the present inventive concept are only used to describe specific embodiments, and are not intended to limit the present inventive concept. The singular expression includes the plural expression unless the context clearly dictates otherwise. In the present inventive concept, terms such as "comprise" or "have" are intended to designate that a feature, number, step, operation, component, part, or combination thereof described in the specification exists, but it should be understood that this does not preclude the existence or addition of one or more other features or numbers, steps, operations, components, parts, or combinations thereof.

Unless otherwise defined, all terms used herein including technical or scientific terms have the same meanings as those generally understood by one of ordinary skill in the art. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, preferred embodiments of the present inventive concept will be described in more detail with reference to the accompanying drawings. In the description of the present inventive concept, in order to facilitate the overall understanding, the same reference numerals are used for the same components in the drawings, and repeated descriptions of the same components are omitted.

When it is described as "Cx to Cy" in the present specification, it should be interpreted as having a number of carbon atoms corresponding to all integers between carbon number x and carbon number y.

As used herein, the term "alkyl group" refers to an aliphatic hydrocarbon group unless otherwise defined. The alkyl group may be a "saturated alkyl group" that does not contain any double or triple bond. The alkyl group may be branched, straight-chain type or cyclic type.

In the present specification, unless otherwise defined, the term "aryl group" may refer to a monocyclic aromatic compound or a polycyclic aromatic compound composed of fused aromatic rings.

As used herein, "substitution" may be one in which one or more or all hydrogens are substituted with a halogen group, specifically, a fluorine group.

An electrolyte additive according to an embodiment of the present inventive concept may be one represented by Chemical Formula 1, one represented by Chemical Formula 2, or a mixture thereof.

[Chemical Formula 1]

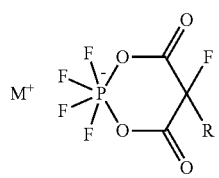

[Chemical Formula 2]

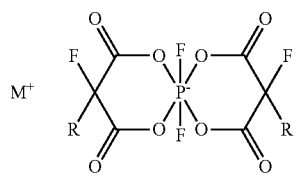

In Chemical Formula 1 and Chemical Formula 2, M may be alkali metal or ammonium. The alkali metal may be, for example, Li (lithium), Na (sodium) or K (potassium). R may be hydrogen, a substituted or unsubstituted C1 to C5 alkyl group, a substituted or unsubstituted C1 to C5 perfluoroalkyl group, a substituted or unsubstituted C6 to C30 aryl group, a substituted or unsubstituted C6 to C30 perfluoroaryl group or $CF_3$.

The electrolyte additive of Chemical Formula 1 may be represented by the following Chemical Formula 3, and the electrolyte additive of Chemical Formula 3 may be lithium tetrafluoro (2-fluoromalonato)phosphate (LiFMTFP).

[Chemical Formula 3]

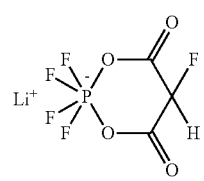

The electrolyte additive of Chemical Formula 2 may be represented by the following Chemical Formula 4, and the electrolyte additive of Chemical Formula 4 may be lithium difluoro bis(2-fluoromalonato)phosphate.

[Chemical Formula 4]

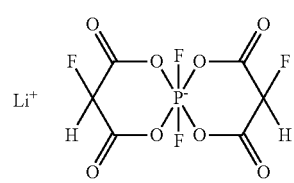

FIG. 1 is a flow chart showing a method of manufacturing an electrolyte additive according to an embodiment of the present inventive concept.

The method for preparing the electrolyte additive may include the step of preparing 2-monofluoromalonic acid (S10).

[Scheme 1]

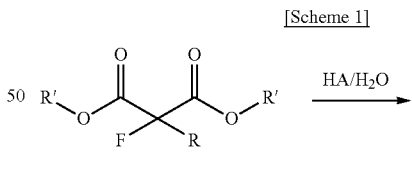

In Scheme 1, R' may be a substituted or unsubstituted C1 to C10 alkyl group, or a substituted or unsubstituted C6 to C30 aryl group. R is hydrogen, a substituted or unsubstituted C1 to C5 alkyl group, a substituted or unsubstituted C1 to C5 perfluoro alkyl group, a substituted or unsubstituted C6 to C30 aryl group, a substituted or unsubstituted C6 to C30 perfluoroaryl group or $CF_3$.

As shown in Scheme 1, the step of preparing 2-monofluoromalonic acid may include reacting 2-monofluoromalonic acid ester with an acid (HA). Specifically, the acid may be provided as an acidic solution, which is a solution containing the acid. The acidic solution may be an aqueous solution containing the acid.

The 2-monofluoromalonic acid may be, for example, 2-fluoromalonic acid. The 2-monofluoromalonic acid may be dried, and may be dried using heating or vacuum drying. The water concentration in 2-monofluoromalonic acid may be 150 wt ppm or less, and preferably 120 wt ppm or less. When the water concentration satisfies the above range, hydrolysis of the phosphate obtained by the following reaction and the electrolyte additive of the present inventive concept obtained according to the present reaction can be suppressed.

The step of preparing 2-monofluoromalonic acid may be carried out at a reaction temperature of 25 to 60° C., preferably 30 to 50° C., and the reaction may be carried out at room temperature. Any acidic solution can be used as long as it is reacted with 2-monofluoromalonic acid ester to produce 2-monofluoromalonic acid. Here, in the case of reacting 2-monofluoromalonic acid ester with a basic solution, the reaction must be carried out in 2-steps, but in the case of using an acidic solution, the reaction is carried out in 1-step, simplifying the reaction step; and thus the synthesis time may be shortened. Furthermore, when an acidic solution is used compared to when a basic solution is used, the type of reaction by-products may be reduced, and there may be an advantage in that the reaction yield is excellent.

The preparing of 2-monofluoromalonic acid may further include drying the reaction solution using a dehydrating agent. Since the reaction in the step of preparing 2-monofluoromalonic acid is carried out in the presence of an acidic solution, specifically, in the presence of water, the water content of the product may be high. Therefore, by drying the reaction solution, 2-monofluoromalonic acid can be obtained. Here, in order to remove moisture contained in the product, as long as it can be dried without affecting the structure or content of 2-monofluoromalonic acid, any method other than the method using a dehydrating agent may be used without limitation.

The dehydrating agent may be used without limitation as long as it does not affect the reaction while removing moisture from the product, 2-monofluoromalonic acid. For example, orthoesters of $R^1C(OR^2)_3$ may be used as the dehydrating agent, and in this case, water may be removed as shown in Scheme 2 below. Here, $R^1$ may be hydrogen or a C1 to C5 alkyl group, $R^2$ may be a C1 to C5 alkyl group, and $R^1$ and $R^2$ may each be independently selected. As an example, orthoesters may be trimethyl orthoformate and triethyl orthoformate, but is not limited thereto.

[Scheme 2]

In addition to this, an organic dehydrating agent such as silicates can be used, or an inorganic dehydrating agent can be used. As silicates, tetraethyl silicate etc. can be used.

The method for preparing the electrolyte additive according to the present inventive concept may include reacting hexafluorophosphate and 2-monofluoromalonic acid (S20) as shown in Scheme 3 or 4 below.

[Scheme 3]

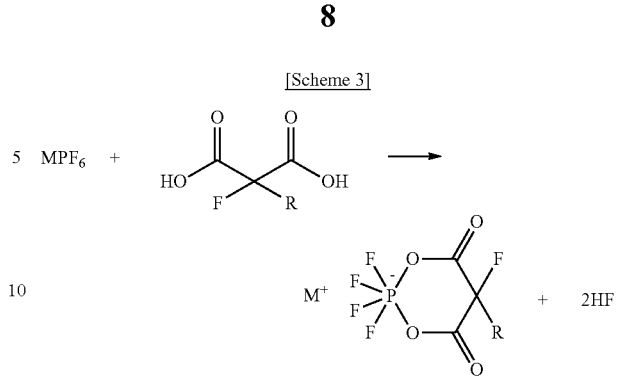

[Scheme 4]

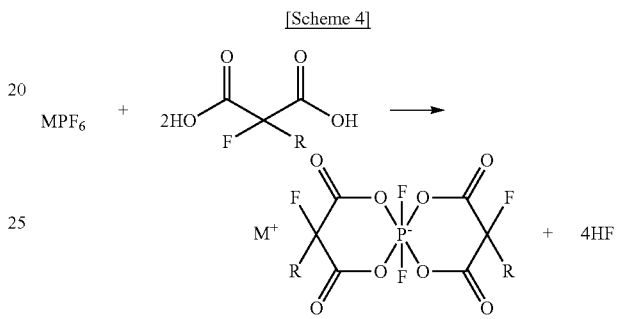

In Schemes 3 and 4, M is an alkali metal or ammonium.

The hexafluorophosphate may be alkali hexafluorophosphate or ammonium hexafluorophosphate, but is not limited thereto. The alkali hexafluorophosphate may be, for example, lithium hexafluorophosphate ($LiPF_6$), sodium hexafluorophosphate ($NaPF_6$), or potassium hexafluorophosphate ($KPF_6$). The ammonium hexafluorophosphate may be a tetraalkylammonium hexafluorophosphate. Preferably, the hexafluorophosphate may be lithium hexafluorophosphate ($LiPF_6$).

The molar ratio of hexafluorophosphate to 2-monofluoromalonic acid may satisfy the equivalent ratio of Scheme 3 or 4 above. Specifically, in the case of Scheme 3, the molar ratio of hexafluorophosphate to 2-monofluoromalonic acid may be 1:0.9 to 1:1.1, preferably 1:0.95 to 1:1.05. In addition, in the case of Scheme 4, the molar ratio of hexafluorophosphate to 2-monofluoromalonic acid may be 1:1.8 to 1:2.2, preferably 1:1.9 to 1:2.1.

The above reaction may be carried out in a reaction solvent. The reaction solvent may be an organic solvent, specifically, a non-aqueous organic solvent. The non-aqueous organic solvent may be carbonate-based, ester-based, ether-based, ketone-based, or alcohol-based, or a combination thereof.

Specifically, the carbonate-based organic solvent may be a cyclic carbonate or a linear carbonate. The cyclic carbonate may be ethylene carbonate (EC), fluoroethylene carbonate, propylene carbonate (PC), or butylene carbonate (BC), and the linear carbonate may be dimethyl carbonate (DMC), diethyl carbonate (DEC), dipropyl carbonate (DPC), ethylmethyl carbonate (EMC), methylpropyl carbonate (MPC), or ethylpropyl carbonate (EPC).

The ester-based organic solvent may be methyl formate, methyl acetate, ethyl acetate, isopropyl acetate, isoamyl acetate, methyl propionate, ethyl propionate, methyl butylate, or ethyl butylate, etc., but is not limited thereto.

The ether-based organic solvent may be dibutyl ether, tetraglyme (tetraethylene glycol dimethyl ether, TEGDME), diglyme (diethylene glycol dimethyl ether, DEGDME), dimethoxy ethane, 2-methyltetrahydrofuran, or tetrahydrofuran, etc., but is not limited thereto.

The ketone-based organic solvent may be cyclohexanone and the like, and the alcohol-based solvent may be ethyl alcohol, isopropyl alcohol, or the like, but is not limited thereto.

Specifically, a carbonate-based organic solvent or an ester-based organic solvent may be used as the reaction solvent, and preferably, the carbonate-based organic solvent may be ethylmethyl carbonate (EMC), dimethyl carbonate (DMC), or diethyl carbonate (DEC). These non-aqueous organic solvents may be dehydrated ones, and these may be used alone or in combination of two or more thereof.

The moisture concentration in the non-aqueous organic solvent may be 30 wt ppm or less, preferably 15 wt ppm or less. When the moisture concentration satisfies the above range, the hydrolysis of the phosphate and the electrolyte additive of the present inventive concept may be suppressed.

The reaction temperature may be in the range of 5 to 60° C., preferably, may be in the range of 10 to 45° C. When the temperature range is satisfied, generation of by-products and decomposition of the solvent can be suppressed, and there is no need to lengthen the reaction time due to excellent reactivity, so there are advantages. Also, the yield of the electrolyte additive according to the present inventive concept may be excellent.

It may include a step of further adding a HF scavenger to the mixed solution produced by the reaction (S30).

The HF scavenger serves to remove the HF gas generated by the reaction of the hexafluorophosphate and 2-monofluoromalonic acid, and if the HF scavenger is added to the mixture of the hexafluorophosphate and 2-monofluoromalonic acid, the forward reaction of the synthesis reaction can proceed favorably.

As the HF scavenger, anyone can be used as long as it serves to remove HF gas and does not participate in the electrolyte addition reaction according to the present inventive concept. As an example, it may include a halide other than fluoride, a silane compound, or a combination thereof. In addition, the HF scavenger may be lithium carbonate, sodium carbonate, calcium hydroxide, sodium hydroxide, activated carbon, or the like, but is not limited thereto.

The halide may be converted into an acid such as hydrogen chloride (HCl), hydrogen bromide (HBr), or hydrogen iodide (HI) with high vapor pressure by reacting with HF, and then purified and removed by distillation or the like. The halide may be a chloride, a bromide, or an iodide, and an inorganic halide, an organic halide, or a combination thereof may be used as the halide.

The inorganic halide may be an alkali metal halide, an alkaline earth metal halide, a metalloid halide, a post-transition metal halide, a metalloid halide, or the like. Specifically, the alkali metal halide may be lithium chloride, lithium bromide, lithium iodide, sodium chloride, sodium bromide, sodium iodide, potassium chloride, potassium bromide, potassium iodide, cesium chloride, cesium bromide, cesium iodide, or the like. The alkaline earth metal halide may be magnesium chloride, magnesium bromide, magnesium iodide, calcium chloride, calcium bromide, calcium iodide, barium chloride, barium bromide, barium iodide, or the like. The post-transition metal halide may be aluminum trichloride, aluminum tribromide, aluminum triiodide, or the like. The metalloid halide may be a silicon halide, and the silicon halide may be silicon tetrachloride, silicon tetrabromide, silicon tetraiodide, dichlorodimethylsilane, chlorotrimethylsilane, or the like.

The organic halide may be an ammonium halide, a phosphorus halide, or the like. Specifically, the ammonium halide may be tetramethylammonium chloride, tetramethylammonium bromide, tetramethylammonium iodide, or the like. The phosphorus halide may be phosphorus trichloride, phosphorus tribromide, phosphorus triiodide, or the like. In addition, the organic halide may be acetyl chloride, acetyl bromide, acetyl iodide, propionyl chloride, propionyl bromide, propionyl iodide, oxalyl chloride, oxalyl bromide, oxalyl iodide, or the like.

More specifically, the halide may be an alkali metal halide, a silicon halide, a phosphorus halide, or a combination thereof. Preferably, the halogen contained in the halide may be chlorine (Cl), and accordingly, lithium chloride, silicon tetrachloride, dichlorodimethylsilane, chlorotrimethylsilane, phosphorus trichloride, or a combination thereof may be used as the halide. Since they have a fast reaction rate, productivity can be improved, and cations irrelevant to the lithium ion battery may not remain in the electrolyte.

The HF formed according to the present reaction can be removed as much as the number of halogens included in the halide. Therefore, when the number of halogens included in one molecule of the halide is n, the lower limit of the amount of the halide used with respect to 1 mole of HF may be 1/n mole, preferably 1.2/n mole, and the upper limit is 5/n mole, preferably 3/n mol. When the above range is satisfied, acids or unreacted halides that adversely affect battery performance may not remain.

The silane compound refers to a compound including a silyl group, and may be an acyclic silane compound, a cyclic silane compound, or a combination thereof. As an example, the acyclic silane compound may be tris(trimethylsilyl) phosphite (TMSP) or hexamethyldisiloxane (HMDSO), and the cyclic silane compound may be octamethylcyclotetrasiloxane or decamethylcyclopentasiloxane, but is not limited to.

Meanwhile, since the product according to the preparation of the electrolyte additive may be hydrolyzed by moisture, the reaction may be performed in an inert gas atmosphere, which is an atmosphere that does not contain moisture. For example, it may be carried out under an inert gas atmosphere such as nitrogen or argon.

Concentrating and drying the reaction solution obtained from the above (S40) may be performed. Concentration and drying are performed by a method using a vapor pressure difference, and in detail, by-products can be removed by introducing an inert gas into a solution under reduced pressure and discharging it together with the inert gas. A vacuum pump, an aspirator, etc. can be used for the pressure reduction, and it may be carried out by keeping the pressure below atmospheric pressure in the system after making the reactor in a sealed state. The introduction of an inert gas into the solution can be performed by bubbling the solution with nitrogen, helium, neon, argon, krypton or xenon gas. The depressurization of the reaction system and the introduction of an inert gas in the solution can be made simultaneously. Also, upon reduced pressure and/or introduction of an inert gas, the solution may be heated to 20 to 50° C. Accordingly, it is possible to obtain the electrolyte additive according to the present inventive concept in solid form.

According to another embodiment of the present inventive concept, an electrolyte composition including an electrolyte additive, an alkali salt, and a non-aqueous organic solvent may be provided.

The electrolyte additive according to the present inventive concept may be one of the electrolyte additives represented by Chemical Formulas 1 to 4 above.

The electrolyte additive according to the present inventive concept may be included in an amount of 0.1 to 10% by weight based on the total amount of the electrolyte composition. Preferably, the electrolyte additive according to the present inventive concept may be included in an amount of 0.5 to 5% by weight based on the total amount of the electrolyte composition. When the content satisfies the above range, the stability improvement effect of the electrode may be sufficiently exhibited. In detail, it is possible to suppress an increase in the internal resistance of the secondary battery due to the occurrence of a side reaction.

The electrolyte additives of Chemical Formulas 1 to 4 may be used alone as an electrolyte additive in the electrolyte composition, or may be used in combination with a coating agent that forms a stable and uniform protective film on the electrode of the secondary battery. The coating agent may be, but is not limited to, fluoroethylene carbonate (FEC), vinylene carbonate (VC), vinylethylene carbonate (VEC), or mixtures thereof.

As an example, lithium tetrafluoro (2-fluoromalonato) phosphate (LiFMTFP) may be used as an electrolyte additive of the present inventive concept, and fluoroethylene carbonate may be used as a coating agent. When adding fluoroethylene carbonate to the electrolyte composition containing lithium tetrafluoro (2-fluoromalonato)phosphate (LiFMTFP), lithium tetrafluoro (2-fluoromalonato)phosphate (LiFMTFP) and fluoroethylene carbonate may have a weight ratio of 1:10 to 2:5, specifically, 1:10 to 3:10, preferably 1:5.

As the alkali salt, alkali salts commonly used in electrolytes of secondary batteries may be used. Examples of the alkali salt may be, but are not limited to, $MPF_6$, $MAsF_6$, $MCF_3SO_3$, $MN(CF_3SO_2)_2$, $MBF_4$, $MBF_6$, $MSbF_6$, $MN(C_2F_5SO_2)_2$, $MAlO_4$, $MAlCl_4$, $MSO_3CF_3$, or $MClO_4$. In addition, these may be used alone, or two or more may be used in combination. Here, M is an alkali metal, and may be Li (lithium), Na (sodium), or K (potassium).

The concentration of the alkali salt in the electrolyte composition may be 0.1 to 3M, for example, 0.1 to 2M. When this concentration range is satisfied, since the electrolyte may have appropriate conductivity and viscosity, it may be advantageous for insertion and desertion of alkali ions during charging and discharging, and decomposition of the solvent due to side reactions may be suppressed.

The non-aqueous organic solvent is an organic solvent commonly used in secondary batteries, which can minimize decomposition due to oxidation reactions during charging and discharging, and may exhibit the desired properties of the present inventive concept together with additives. Examples of the non-aqueous organic solvent may be carbonate-based, ester-based, ether-based, ketone-based, or alcohol-based. These may be used alone, or two or more may be used in combination.

Preferably, among the organic solvents, in particular, a carbonate-based organic solvent can be used. As an example of the carbonate-based organic solvent, there are cyclic carbonates and linear carbonates, and the cyclic carbonates may include ethylene carbonate (EC), fluoroethylene carbonate, propylene carbonate (PC) or butylene carbonate (BC), or the like, and linear carbonates may include dimethyl carbonate (DMC), diethyl carbonate (DEC), dipropyl carbonate (DPC), ethylmethyl carbonate (EMC), methylpropyl carbonate (MPC) or ethylpropyl carbonate (EPC). Preferably, the non-aqueous organic solvent may be ethylene carbonate (EC), dimethyl carbonate (DMC), ethylmethyl carbonate (EMC), or a combination thereof. In this case, the volume ratio of the organic solvent may be applied as EC:EMC:DMC=3:4:3.

The organic solvent may be an ester-based solvent, and more specifically, methyl formate, methyl acetate, ethyl acetate, isopropyl acetate, isoamyl acetate, methyl propionate, ethyl propionate, methyl butylate, or ethyl butylate.

The organic solvent may be an ether-based solvent, and examples of the ester-based solvent may include dibutyl ether, tetraglyme (tetraethylene glycol dimethyl ether, TEGDME), diglyme (diethylene glycol dimethyl ether, DEGDME), and dimethoxy ethane, 2-methyltetrahydrofuran, tetrahydrofuran, or the like.

A ketone-based solvent may be used as the organic solvent, and the ketone-based solvent may be cyclohexanone, etc., and the alcohol-based solvent may be ethyl alcohol, isopropyl alcohol, etc.

Another embodiment of the present inventive concept may provide a secondary battery including the electrolyte additive.

Figure 2:
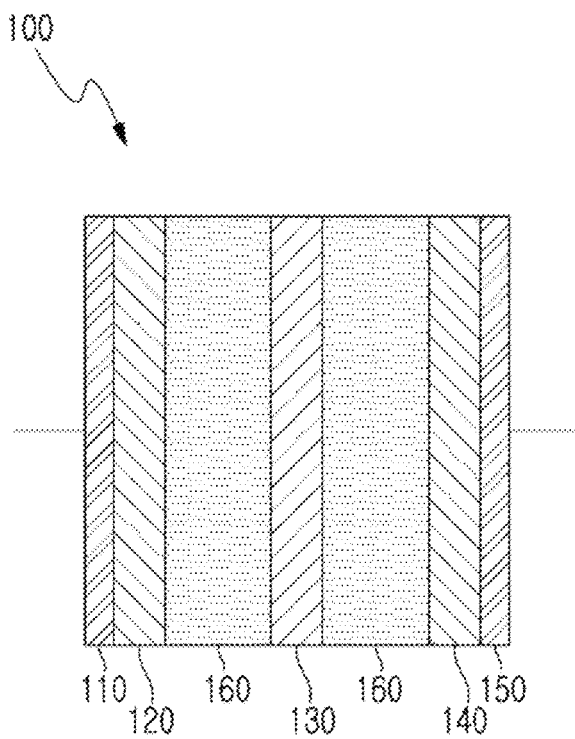
FIG. 2 is a schematic diagram illustrating a secondary battery according to an embodiment of the present inventive concept.

FIG. 2 is a schematic diagram illustrating a secondary battery according to an embodiment of the present inventive concept.

Referring to FIG. 2, the secondary battery 100 includes an anode active material layer 120 containing an anode active material, a cathode active material layer 140 containing a cathode active material, and a separator 130 interposed between those. An electrolyte 160 may be disposed or charged between the anode active material layer 120 and the separator 130 and between the cathode active material layer 140 and the separator 130. The anode active material layer 120 may be disposed on the anode current collector 110, and the cathode active material layer 140 may be disposed on the cathode current collector 150.

<Cathode>

The cathode 140 may be formed by coating a slurry in which a cathode active material, a binder, and a solvent are mixed on the cathode current collector 150. The cathode may be manufactured using a cathode material obtained by mixing an active material for a secondary battery, a conductive material, and a binder.

The cathode active material may be a commonly known layered alkali composite metal compound. As an example, the cathode active material may contain at least one of a composite phosphorous oxide or a composite oxide of cobalt, nickel, manganese, chromium, or a combination thereof and lithium. More specifically, the cathode active material may be $M_x(Ni_aCo_bMn_cAl_d)O_2$ (here, $0.5 \le x \le 1.5$, $0 \le a \le 1$, $0 \le b \le 1$, $0 \le c \le 1$, $0 \le d < 1$, $a+b+c+d=1$), $M(Ni_aCo_bMn_c)O_4$ ($0 < a \le 2$, $0 < b \le 2$, $0 < c \le 2$, $a+b+c=2$), or $MTmPO_4$ (Tm is Fe, Mn, Co, Ni, or a combination thereof). Here, M is an alkali metal, and may be Li (lithium), Na (sodium), or K (potassium). The cathode active material may be specifically, $MCoO_2$, $MCoPO_4$, $MNiO_2$, $MNiPO_4$, $MMnO_2$, $MMn_2O_4$, $MMnPO_4$, $MCrO_2$, $MNi_{0.6}Co_{0.2}Mn_{0.2}O_2$, $MNiMnCoO_2$, $M(Co_xNi_{1-x})O_2$ ($0.5 \le x < 1$), etc., but is not limited thereto. As an example, the cathode active material may include $LiNi_{0.6}Co_{0.2}Mn_{0.2}O_2$.

In addition, the cathode active material may be a lithium-rich cathode active material. The lithium-rich cathode active material may be a compound containing an excess of lithium, and may exhibit high capacity and high energy density of a battery. The lithium-rich cathode active material may be one represented by the following Formula 3.

$$Li_xNi_yMn_zCo_wO_2 \qquad \text{[Formula 3]}$$

In Formula 3, $1<x\le2$, $0<y\le1$, $0<z\le1$, and $0<w\le1$.

Furthermore, a coating layer may be included on the surface of the cathode active material. The coating layer is a compound of a coating element, and may include oxide, hydroxide, oxyhydroxide, oxycarbonate, or hydroxycarbonate of the coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. For the coating layer forming process, any coating method may be used as long as it is a coating method that does not adversely affect the physical properties of the cathode active material (e.g., spray coating, dipping, etc.).

The conductive material may be a carbon material such as natural graphite, artificial graphite, coke, carbon black, carbon nanotubes, or graphene. The binder may be a thermoplastic resin, for example, fluororesin such as polyvinylidene fluoride, polytetrafluoroethylene, ethylene tetrafluoride, vinylidene fluoride-based copolymer, propylene hexafluoride, and/or polyolefin resin such as polyethylene or polypropylene.

The cathode current collector 150 may be a metal having heat resistance, and may be, for example, iron, copper, aluminum, nickel, stainless steel, titanium, tantalum, gold, platinum, or the like. In one embodiment, the cathode current collector may be aluminum or stainless steel. The upper surface of the cathode current collector 150 may also be roughened to improve adhesion with the cathode active material layer 140.

<Anode>

The anode active material can intercalate and deintercalate lithium ions or can cause a conversion reaction, and may be a metal, metal alloy, metal oxide, metal fluoride, metal sulfide, a carbon material such as graphite (natural graphite, artificial graphite), cokes, carbon black, carbon nanotube, graphene, or silicon. Preferably, graphite or a silicon-graphite composite may be used as the anode active material.

An anode material can be obtained by mixing the anode active material, a conductive material and a binder. In this case, the conductive material may be a carbon material such as natural graphite, artificial graphite, coke, carbon black, carbon nanotubes, or graphene. The binder may be a thermoplastic resin, for example, fluororesin such as polyvinylidene fluoride, polytetrafluoroethylene, ethylene tetrafluoride, vinylidene fluoride-based copolymer, propylene hexafluoride, and/or polyolefin resin such as polyethylene or polypropylene.

The anode material can be applied on an anode current collector to form an anode. The anode current collector may be a conductor such as aluminum (Al), nickel (Ni), stainless steel (SUS), or molybdenum (Mo). Applying the anode material on the anode current collector may be performed by pressure molding, or a method of making a paste using an organic solvent or the like, then applying the paste on the current collector and pressing the paste to fix it. The organic solvent may be an amine-based solvent such as N,N-dimethylaminopropylamine or diethyltriamine; ethers such as ethylene oxide and tetrahydrofuran; ketones such as methyl ethyl ketone; esters such as methyl acetate; an aprotic polar solvent such as dimethylacetamide or N-methyl-2-pyrrolidone. Applying the paste on the anode current collector may be performed using, for example, a gravure coating method, a slit die coating method, a knife coating method, or a spray coating method.

<Electrolyte>

As described above, the present inventive concept may provide an electrolyte including the electrolyte additive of Chemical Formulas 1 to 4, a lithium salt, and a non-aqueous organic solvent.

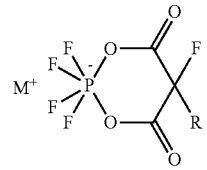

[Chemical Formula 1]

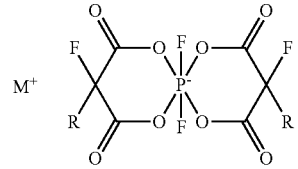

[Chemical Formula 2]

In Chemical Formulas 1 and 2, M may be an alkali metal or ammonium. The alkali metal may be, for example, Li (lithium), Na (sodium), or K (potassium). R may be hydrogen, a substituted or unsubstituted C1 to C5 alkyl group, a C1 to C5 perfluoro alkyl group, a substituted or unsubstituted C6 to C30 aryl group, a C6 to C30 perfluoroaryl group, or $CF_3$.

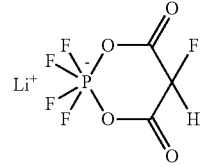

[Chemical Formula 4]

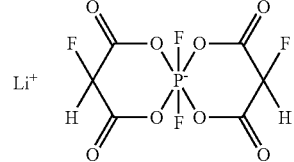

[Chemical Formula 4]

In particular, in the case of the electrolyte additive according to Chemical Formulas 3 and 4, the electrochemical properties of the secondary battery including the same may be more excellent compared to the compound in which two hydrogens are attached to the alpha carbon of the malonate group.

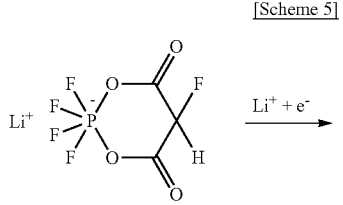

[Scheme 5]

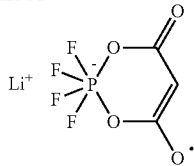 + LiF

In the case of the compound according to Chemical Formulas 3 and 4 in which fluorine is attached to the alpha carbon of the malonate group, LiF may be formed. As an example of the reaction for forming LiF, referring to Scheme 5 above, fluorine attached to the alpha carbon of the malonate group may react with lithium ions (Lit) and electrons to form LiF. When LiF is generated as described above, LiF forms a film surrounding the electrode to inhibit the elution of the transition metal of the electrode, and as a result, the electrochemical performance of the secondary battery including the electrolyte additive can be improved in terms of durability, etc.

[Scheme 6]

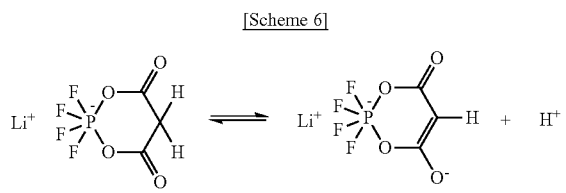

On the other hand, referring to Scheme 6, in the case of a compound in which two hydrogens are attached to the alpha carbon of the malonate group, the fluorine group is not bonded to the alpha carbon, thereby forming an acid atmosphere in the electrolyte. That is, unlike the compounds of Chemical Formulas 3 and 4, LiF serving as a protective layer of the electrode cannot be formed, and further, the formed acid may promote a side reaction of the electrolyte.

The electrolyte additives of Chemical Formulas 1 to 4 according to the present inventive concept may be used by mixing with a coating agent. The coating agent may form a stable and uniform protective film on the electrode of the secondary battery. As an example, the coating agent may be fluoroethylene carbonate (FEC). In addition to this, the coating agent may be vinylene carbonate (VC) or vinylethylene carbonate (VEC).

The coating agent has a lower reduction potential than the electrolyte additive of Chemical Formulas 1 to 4, and when used in combination with the electrolyte additive according to the present inventive concept, the coating agent can be reduced and decomposed earlier than the electrolyte additive of Chemical Formulas 1 to 4. That is, the electrolyte additives of Chemical Formulas 1 to 4 may have a lower reductive decomposition.

As such, when the electrolyte additive according to the present inventive concept and the coating agent are mixed, a uniform and stable protective film may be generated on the electrode of the secondary battery including the same by the coating agent, and then, the preformed protective layer and the electrode may be protected by the electrolyte additive of Chemical Formulas 1 to 4. Therefore, as the interface between the electrode material and the electrolyte is stabilized by the electrolyte additive, the lithium secondary battery including the electrolyte additive according to the present inventive concept may have improved cycle life characteristics at room temperature, and the electrochemical performance can be improved.

Furthermore, the electrolyte additives of Chemical Formulas 1 to 4 according to the present inventive concept may be used alone as an electrolyte additive in the electrolyte composition. By adding the electrolyte additive of Chemical Formulas 1 to 4 alone as an electrolyte additive in the electrolyte composition, even when an additional electrolyte additive such as the coating agent is not further added, the stability of the electrode interface may be improved, and a secondary battery including the same may exhibit excellent electrochemical properties.

In particular, since excellent cycle capacity retention, lifespan characteristics and coulombic efficiency at high temperatures, and excellent storage performance at high temperatures are exhibited, the secondary battery can be driven with excellent stability even at high temperatures. In addition, even when an additional electrolyte additive such as the coating agent is not included, the secondary battery including the electrolyte additive according to the present inventive concept may have excellent room temperature life performance at room temperature.

Accordingly, the secondary battery including the electrolyte additive according to the present inventive concept may have excellent high-temperature lifespan characteristics. In addition, even when a cathode including a lithium-rich active material and an anode including a silicon-graphite composite active material are used, the secondary battery can be stably driven while exhibiting high capacity and high voltage. Accordingly, it is possible to increase the energy density of the secondary battery and improve the capacity retention rate characteristics.

<Separator>

A separator 130 may be disposed between the anode and the cathode. The separator may be a material having the form of a porous film, a nonwoven fabric, or a woven fabric made of a material such as a polyolefin resin such as polyethylene or polypropylene, a fluororesin, or a nitrogen-containing aromatic polymer. The thickness of the separator is preferably thinner as long as the mechanical strength is maintained from the viewpoint of increasing the volume energy density of the battery and decreasing the internal resistance. The thickness of the separator may be generally about 5 to 200 μm, and more specifically, 5 to 40 μm.

<Manufacturing Method of Secondary Battery>

After the cathode, the separator, and the anode are sequentially stacked to form an electrode group, if necessary, the electrode group is rolled up and stored in a battery can, and the secondary battery can be manufactured by impregnating the electrode group with the non-aqueous electrolyte. Alternatively, after forming an electrode group by laminating the cathode, a solid electrolyte, and the anode, if necessary, the electrode group may be rolled up and stored in a battery can to manufacture a secondary battery.

Hereinafter, examples are provided to help in understanding the present inventive concept. However, the following examples are merely provided to help in understanding of the present inventive concept, and the present inventive concept is not limited to the following examples.

EXAMPLES

Preparation Example of 2-fluoro Malonic Acid

At room temperature, 1000 g of a 35% aqueous hydrogen chloride (HCl) solution was added to a 2000 mL 3-neck flask and stirred with a stirrer. Then, 200 g of diethyl 2-fluoromalonate was added dropwise to the flask containing the 35% aqueous hydrogen chloride solution for 1 hour using a dropping funnel. Thereafter, the reaction was performed at 10° C. for 16 hours. At this time, while raising the temperature, hydrogen chloride dissolved in water was generated as a gas, which was absorbed by a can filled with soda lime. After the reaction was completed, trimethyl orthoformate was added and dried under vacuum at 50° C. to obtain 2-fluoromalonic acid.

The obtained 2-fluoromalonic acid was dissolved in dimethylsulfoxide-$d_6$ and NMR analysis was performed to show that the yield of 2-fluoromalonic acid was 92.5% based on diethyl 2-fluoromalonate.

Electrolyte Additive Preparation Example 1

In a glove box with a dew point of −50° C., 100 g of dehydrated ethylmethyl carbonate (EMC) containing 10 mass ppm of water was placed in a 250 ml three-necked round-bottom flask, and 16.23 g (0.107 mol) of lithium hexafluorophosphate (LiPF$_6$) was added and dissolved. Further, after drying 2-fluoromalonic acid obtained according to the Preparation Example of 2-fluoromalonic acid to a moisture content of 100 mass ppm, 13.04 g (0.107 mol) of the dried 2-fluoromalonic acid was added. The three-necked round-bottom flask was taken out of the glove box, immersed in an oil bath at 30° C., and thoroughly stirred using a magnetic stirrer to obtain a mixed solution.

Next, 13.79 g (0.107 mol) of dichlorodimethylsilane (Me$_2$SiCl$_2$) as an HF scavenger was added to the mixture over 1 hour using a dropping funnel. Simultaneously with the addition, difluorodimethylsilane and hydrogen chloride were generated, and the reaction was terminated after sufficiently reacting for 3 hours after the end of gas generation.

After the reaction, the obtained reaction solution was concentrated and dried under reduced pressure of 40° C. and 5 torr to obtain 23.75 g of lithium tetrafluoro(2-fluoromalonato)phosphate (LiFMTFP) in a solid state with a reaction yield of 95%. The electrolyte additive obtained was dissolved in dimethyl sulfoxide-$d_6$ and $^{19}$F-NMR analysis was performed to show that lithium tetrafluoro(2-fluoromalonato)phosphate (LiFMTFP) was 99% by mass.

Electrolyte Additive Preparation Example 2

An electrolyte additive was prepared in the same manner as in Electrolyte Additive Preparation Example 1, except that 9.06 g (0.214 mol) of lithium chloride (LiCl) was used as the HF scavenger. As a result, 22.5 g of lithium tetrafluoro(2-fluoromalonato)phosphate (LiFMTFP) in a solid state was obtained in a reaction yield of 90%, which was found to be 97% by mass as a result of $^{19}$F-NMR analysis.

Electrolyte Additive Preparation Example 3

An electrolyte additive was prepared in the same manner as in Electrolyte Additive Preparation Example 1, except that 9.83 g (0.072 mol) of phosphorus trichloride (PCl$_3$) was used as the HF scavenger. As a result, 21.25 g of lithium tetrafluoro(2-fluoromalonato)phosphate (LiFMTFP) in a solid state was obtained in a reaction yield of 85%, which was found to be 45% by mass as a result of $^{19}$F-NMR analysis.

Electrolyte Additive Preparation Example 4

An electrolyte additive was prepared in the same manner as in Electrolyte Additive Preparation Example 1, except that the reaction was carried out at a reaction temperature of 60° C. As a result, 24.5 g of lithium tetrafluoro(2-fluoromalonato)phosphate (LiFMTFP) in a solid state was obtained in a reaction yield of 98%, which was found to be 91% by mass as a result of $^{19}$F-NMR analysis.

Electrolyte Additive Preparation Example 5 An electrolyte additive was prepared in the same manner as in Electrolyte Additive Preparation Example 1, except that 7.78 g (0.072 mol) of chlorotrimethylsilane (Me$_3$SiCl) was used as the HF scavenger and the reaction was carried out at a reaction temperature of 10° C. As a result, 11.25 g of lithium tetrafluoro(2-fluoromalonato)phosphate (LiFMTFP) in a solid state was obtained in a reaction yield of 45%, which was found to be 65% by mass as a result of $^{19}$F-NMR analysis.

Electrolyte Additive Preparation Example 6

An electrolyte additive was prepared in the same manner as in Electrolyte Additive Preparation Example 1, except that 9.83 g (0.072 mol) of phosphorus trichloride (PCl$_3$) was used as the HF scavenger and the reaction was carried out at a reaction temperature of 45° C. As a result, 15 g of lithium tetrafluoro(2-fluoromalonato)phosphate (LiFMTFP) in a solid state was obtained in a reaction yield of 60%, which was found to be 57% by mass as a result of $^{19}$F-NMR analysis.

Electrolyte Additive Preparation Example 7

An electrolyte additive was prepared in the same manner as in Electrolyte Additive Preparation Example 1, except that 9.08 g (0.053 mol) of silicon tetrachloride (SiCl$_4$) was used as the HF scavenger, diethyl carbonate (DEC) was used as the organic solvent, and the reaction was carried out at a reaction temperature of 10° C. As a result, 19.5 g of lithium tetrafluoro(2-fluoromalonato)phosphate (LiFMTFP) in a solid state was obtained in a reaction yield of 78%, which was found to be 85% by mass as a result of $^{19}$F-NMR analysis.

Electrolyte Additive Preparation Example 8

An electrolyte additive was prepared in the same manner as in Electrolyte Additive Preparation Example 1, except that ethyl acetate (AcOEt) was used as the organic solvent. As a result, 24 g of lithium tetrafluoro(2-fluoromalonato)phosphate (LiFMTFP) in a solid state was obtained in a reaction yield of 96%, which was found to be 90% by mass as a result of $^{19}$F-NMR analysis.

Table 1 below summarizes the Electrolyte Additive Preparation Examples.

TABLE 1

| Electrolyte Additive Preparation Examples | Reaction Condition | | | | Reaction Result | | |
|---|---|---|---|---|---|---|---|
| | Organic Solvent | Reaction Temp. (°C.) | phosphate | HF scavenger | LiFMTFP weight (g) | Reaction Yield (%) | LiFMTFP content (%) |
| Preparation Example 1 | EMC | 30 | $LiPF_6$ | $Me_2SiCl_2$ | 23.75 | 95 | 99 |
| Preparation Example 2 | EMC | 30 | $LiPF_6$ | LiCl | 22.5 | 90 | 97 |
| Preparation Example 3 | EMC | 30 | $LiPF_6$ | $PCl_3$ | 21.25 | 85 | 45 |
| Preparation Example 4 | EMC | 60 | $LiPF_6$ | $Me_2SiCl_2$ | 24.5 | 98 | 91 |
| Preparation Example 5 | DEC | 10 | $LiPF_6$ | $Me_3SiCl$ | 11.25 | 45 | 65 |
| Preparation Example 6 | DEC | 45 | $LiPF_6$ | $PCl_3$ | 15 | 60 | 57 |
| Preparation Example 7 | DEC | 10 | $LiPF_6$ | $SiCl_4$ | 19.5 | 78 | 85 |
| Preparation Example 8 | AcOEt | 30 | $LiPF_6$ | $Me_2SiCl_2$ | 24 | 96 | 90 |

Electrolyte Additive Preparation Example 9

In a glove box with a dew point of −50° C., 100 g of dehydrated ethylmethyl carbonate (EMC) containing 10 mass ppm of water was placed in a 250 ml three-necked round-bottom flask, and 16.23 g (0.107 mol) of lithium hexafluorophosphate ($LiPF_6$) was added and dissolved. Further, after drying 2-fluoromalonic acid obtained according to the Preparation Example of 2-fluoromalonic acid to a moisture content of 100 mass ppm, 26.08 g (0.214 mol) of the dried 2-fluoromalonic acid was added. The three-necked round-bottom flask was taken out of the glove box, immersed in an oil bath at 40° C., and thoroughly stirred using a magnetic stirrer to obtain a mixed solution.

Next, 27.58 g (0.214 mol) of dichlorodimethylsilane ($Me_2SiCl_2$) as an HF scavenger was added to the mixture over 1 hour using a dropping funnel. Simultaneously with the addition, difluorodimethylsilane and hydrogen chloride were generated, and the reaction was terminated after sufficiently reacting for 3 hours after the end of gas generation. As a result, lithium difluoro bis(2-fluoromalonato)phosphate represented by Chemical Formula 4 was obtained.

Electrolyte Example 1

In an electrolyte comprising ethylene carbonate (EC): ethylmethyl carbonate (EMC): dimethyl carbonate (DMC) with a volume ratio of 3:4:3 as an organic solvent and 1.15M $LiPF_6$ as a lithium salt, lithium tetrafluoro(2-fluoromalonato)phosphate (LiFMTFP) according to Electrolyte Additive Preparation Example 1 was added in an amount of 1 wt % as an electrolyte additive based on the total amount of the electrolyte to prepare an electrolyte.

Electrolyte Comparative Example 1-1

A non-aqueous electrolyte was prepared in the same manner as in Electrolyte Example 1, except that 5% by weight of fluoroethylene carbonate (FEC) was added instead of 1% by weight of lithium tetrafluoro(2-fluoromalonato)phosphate (LiFMTFP) as the electrolyte additive.

Electrolyte Comparative Example 1-2

A non-aqueous electrolyte was prepared in the same manner as in Electrolyte Example 1, except that 1% by weight of lithium tetrafluoro(oxalato)phosphate (LiTFOP) was added instead of 1% by weight of lithium tetrafluoro (2-fluoromalonato)phosphate (LiFMTFP) as the electrolyte additive.

Electrolyte Example 2

In an electrolyte comprising ethylene carbonate (EC): ethylmethyl carbonate (EMC): dimethyl carbonate (DMC) with a volume ratio of 3:4:3 as an organic solvent and 1.3M $LiPF_6$ as a lithium salt, based on the total amount of the electrolyte, 5 wt % of fluoroethylene carbonate (FEC) and 1 wt % of lithium tetrafluoro(2-fluoromalonato)phosphate (LiFMTFP) according to Electrolyte Additive Preparation Example 1 as electrolyte additives were added to prepare an electrolyte.

Electrolyte Comparative Example 2-1

An electrolyte was prepared in the same manner as in Electrolyte Example 2, except that only fluoroethylene carbonate (FEC) among the electrolyte additives in amount of 5 wt % was added.

Electrolyte Comparative Example 2-2

A non-aqueous electrolyte was prepared in the same manner as in Electrolyte Example 2, except that 1% by weight of lithium tetrafluoro(oxalato)phosphate ($LiPF_4$ ($C_2O_4$), LiTFOP) was added instead of 1% by weight of lithium tetrafluoro(2-fluoromalonato)phosphate (LiFMTFP) as the electrolyte additive.

Table 2 below summarizes the electrolyte Examples and Comparative Examples.

TABLE 2

| Electrolyte Examples and Comparative Examples | EC:EMC:DMC Volume Ratio | LiPF$_6$ Concentration | Additive | Secondary Battery Examples and Comparative Examples |
|---|---|---|---|---|
| Example 1 | 3:4:3 | 1.15M | 1 wt % LiFMTFP | Example 1 |
| Comparative Example 1-1 | 3:4:3 | 1.15M | 5 wt % FEC | Comparative Example 1-1 |
| Comparative Example 1-2 | 3:4:3 | 1.15M | 1 wt % LiTFOP | Comparative Example 1-2 |
| Example 2 | 3:4:3 | 1.3M | 5 wt % FEC + 1 wt % LiFMTFP | Example 2 |
| Comparative Example 2-1 | 3:4:3 | 1.3M | 5 wt % FEC | Comparative Example 2-1 |
| Comparative Example 2-2 | 3:4:3 | 1.3M | 5 wt % FEC + 1 wt % LiTFOP | Comparative Example 2-2 |

Figure 3:
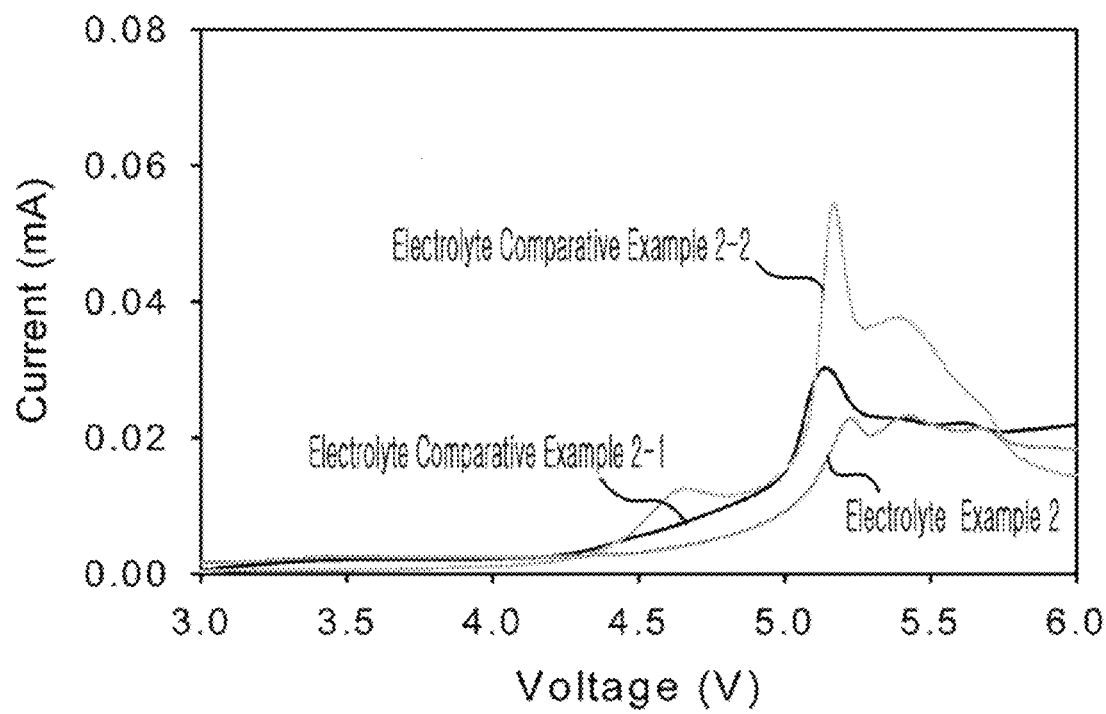
FIG. 3 is a graph showing a voltage-current curve as measured by linear sweep voltammetry of electrolytes according to Electrolyte Example 1 and Electrolyte Comparative Examples 1-1 and 2-2.

FIG. 3 is a graph showing a voltage-current curve as measured by linear sweep voltammetry of electrolytes according to Electrolyte Example 2 and Electrolyte Comparative Examples 2-1 and 2-2. Here, the scan was performed at a scan rate of 1 mV/s in a voltage range of 3 V to 6 V under 25° C.

Referring to FIG. 3, electrolytes according to Electrolyte Examples and Comparative Examples showed similar oxidation stability up to approximately 4.3V, but from then on, it can be seen that peak potential according to the oxidative decomposition reaction increases in the order of Electrolyte Comparative Example 2-2, Electrolyte Comparative Example 2-1, and Electrolyte Example 2. Accordingly, it can be seen that the oxidative decomposition stability of Electrolyte Example 2 is better than that of Electrolyte Comparative Example 2-2 and Electrolyte Comparative Example 2-1, and in the case of Electrolyte Example 2, the oxidative decomposition stability of the electrolyte is greatly improved.

Therefore, when lithium tetrafluoro(2-fluoromalonato)phosphate (LiFMTFP) is used as an additive, compared to using lithium tetrafluoro(oxalato)phosphate (LiPF$_4$(C$_2$O$_4$), LiTFOP), the oxidative stability is excellent. Therefore, the electrochemical stability of the electrolyte containing lithium tetrafluoro(2-fluoromalonato)phosphate (LiFMTFP) is better than the electrolyte containing tetrafluoro(oxalato)phosphate (LiPF$_4$(C$_2$O$_4$), LiTFOP), and thus the electrolyte additive according to the present inventive concept may be more suitable for application to a secondary battery operating under a high voltage.

Secondary Battery Example 1

A cathode active material layer was formed using LiNi$_{0.6}$Co$_{0.2}$Mn$_{0.2}$O$_2$ (NCM622) as a cathode active material, and an anode active material layer was formed using graphite as an anode active material. In addition, the electrolyte prepared according to Electrolyte Example 1 was disposed between the cathode active material layer and the anode active material layer to prepare a lithium secondary battery.

Secondary Battery Comparative Example 1-1

A lithium secondary battery was prepared in the same manner as in Battery Example 1, except that the electrolyte prepared according to Electrolyte Comparative Example 1-1 was used instead of the electrolyte prepared according to Electrolyte Example 1 as the electrolyte.

Secondary Battery Comparative Example 1-2

A lithium secondary battery was prepared in the same manner as in Battery Example 1, except that the electrolyte prepared according to Electrolyte Comparative Example 1-2 was used instead of the electrolyte prepared according to Electrolyte Example 1 as the electrolyte.

Figure 4:
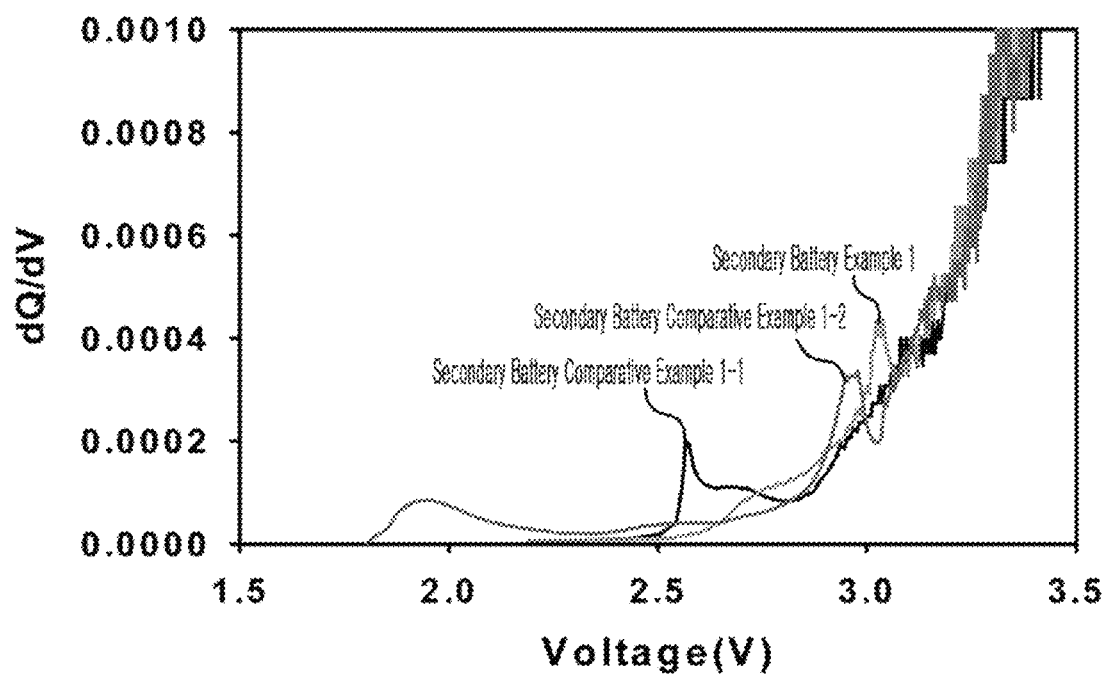
FIG. 4 is a graph showing dQ/dV distributions of secondary batteries according to Secondary Battery Example 1 and Secondary Battery Comparative Examples 1-1 and 1-2.

FIG. 4 is a graph showing dQ/dV distributions of secondary batteries according to Secondary Battery Example 1 and Secondary Battery Comparative Examples 1-1 and 1-2.

After assembling a secondary battery, the performance as the battery is completed only after a predetermined charge/discharge process, that is, a formation process. FIG. 4 is according to the cycle during the formation process. In detail, during one formation charge/discharge, the secondary battery was charged to 4.3V, and a constant voltage (CV) condition was applied at 4.3V after charging, where the stop condition was 0.02 C, and the secondary battery was discharged to 2.7 V at constant current condition. The C-rate was 0.1 C during the lifespan evaluation. Referring to FIG. 4, when main peaks are checked, the reduction potential of the secondary battery according to Secondary Battery Example 1 appears at 3.0 V or higher. On the other hand, it can be seen that the reduction potential of the secondary battery according to Secondary Battery Comparative Example 1-1 is approximately 2.5V, and the reduction potential of the secondary battery according to Secondary Battery Comparative Example 1-2 is 3.0V or less. From this, it can be seen that the FEC and LiTFOP of Secondary Battery Comparative Examples 1-1 and 1-2 will be reduced and decomposed earlier than LiFMTFP contained in the secondary battery according to Secondary Battery Example 1. That is, it can be confirmed that LiFMTFP included in the secondary battery according to Secondary Battery Example 1 has the lowest reductive decomposition tendency.

Figure 5A:
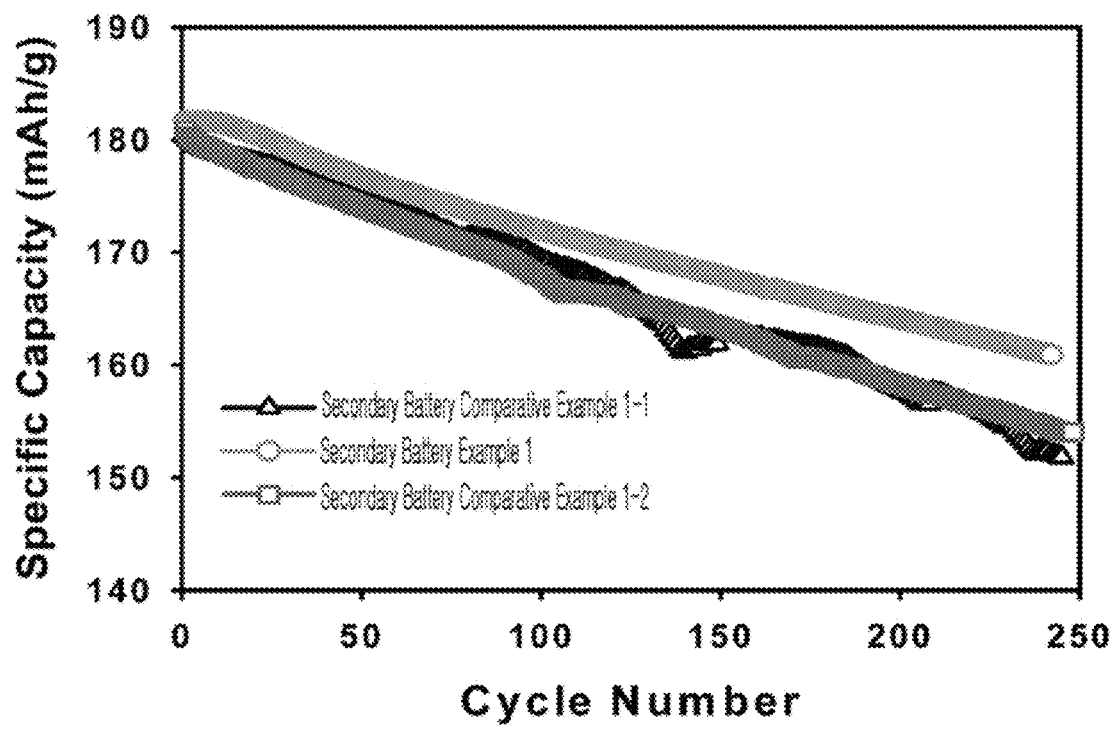
FIGS. 5a-5c are graphs showing high-temperature lifespan characteristics of secondary batteries according to Secondary Battery Example 1 and Secondary Battery Comparative Examples 1-1 and 1-2. In particular.
Figure 5B:
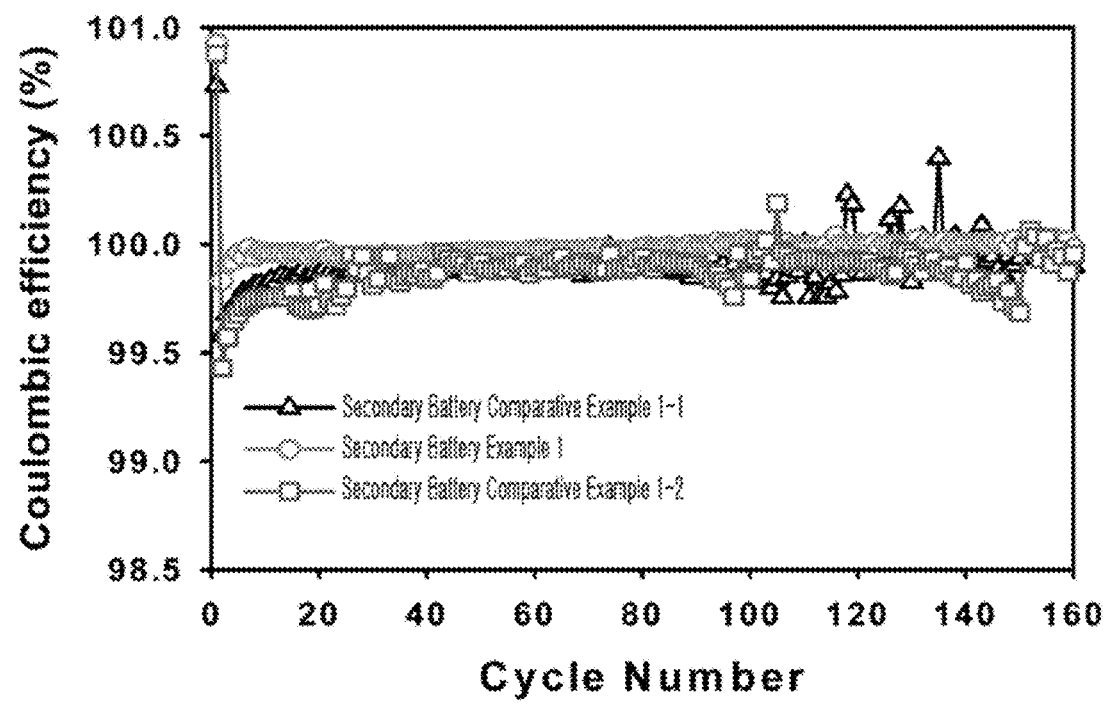

FIG. 5 is a graph showing high-temperature lifespan characteristics of secondary batteries according to Secondary Battery Example 1 and Secondary Battery Comparative Examples 1-1 and 1-2. FIG. 5a is a graph showing specific capacity according to the number of cycles, and FIG. 5b is a graph showing the coulombic efficiency according to the number of cycles.

In FIGS. 5a and 5b, the high temperature lifespan characteristics were evaluated after one formation charge/discharge for each secondary battery. In detail, during one formation charge/discharge, each secondary battery was charged to 4.3 V, and a constant voltage (CV) condition was applied at 4.3 V after charging, where the stop condition was 0.05 C, and the secondary battery was discharged to 2.7 V at constant current condition. The C-rate was 0.1 C during the formation charge/discharge.

In the evaluation of high-temperature lifespan, each secondary battery was charged to 4.3 V at 45° C., and a constant voltage (CV) condition was applied at 4.3V after charging, where the stop condition was 0.05 C, and the secondary battery was discharged to 2.7 V at constant current condition. The C-rate was 0.1 C during the charge/discharge during the lifespan evaluation.

Referring to FIG. 5a, although there is no difference in the initial capacity depending on the electrolyte, it can be seen that there is a difference in the degree of capacity degradation according to the increase in the number of cycles and the specific discharge capacity in the final cycle. Compared to the secondary batteries according to Secondary Battery Comparative Examples, the secondary battery according to Secondary Battery Example 1 exhibited a better specific discharge capacity value even after 250 cycles were performed. Accordingly, it can be confirmed that the secondary battery including the electrolyte additive according to the present inventive concept has excellent capacity retention and lifespan characteristics at high temperatures.

Referring to FIG. 5b, during 160 cycles, compared to the secondary batteries according to Secondary Battery Comparative Examples, the secondary battery according to Secondary Battery Example 1 has a constant Coulombic efficiency value from the initial cycle and the Coulombic efficiency reaches about 99.9%, and thus it can be seen that more stable driving of the secondary battery is performed.

Figure 5C:
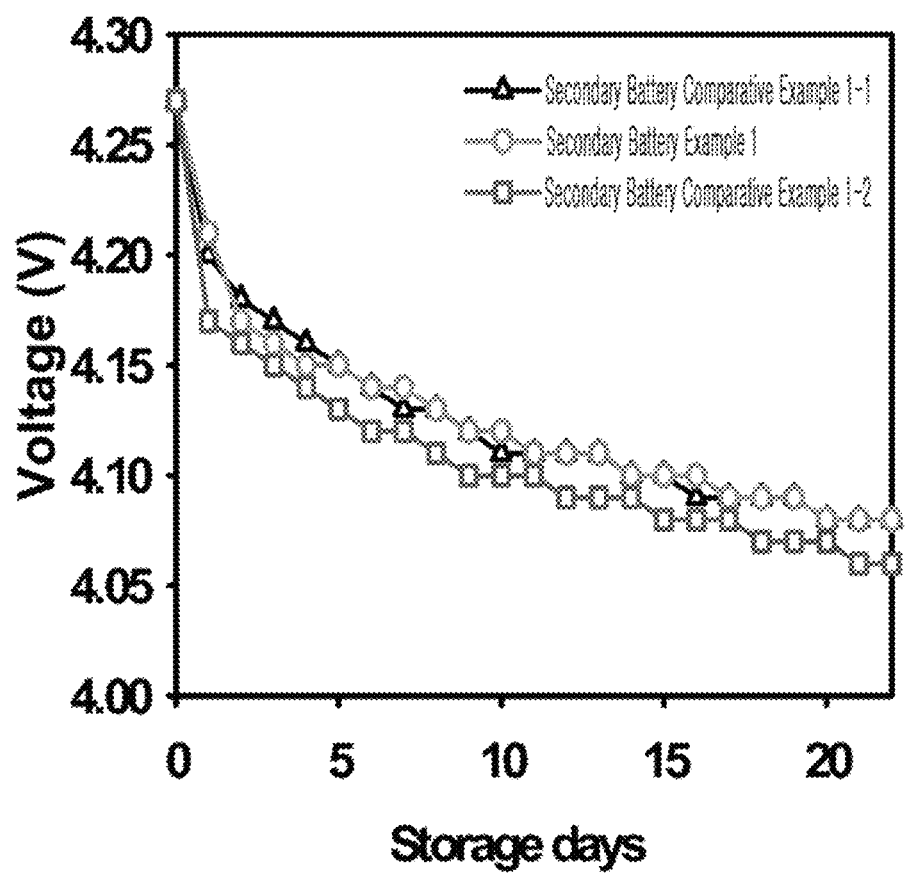

In addition, FIG. 5c is a graph showing the change in open circuit voltage during high-temperature storage.

In FIG. 5c, the high temperature storage performance was confirmed by evaluating the self-discharge characteristics of each secondary battery while storing at 45° C. for about 20 days after one formation charge/discharge and charging. In detail, during one-time formation charge/discharge, each secondary battery was charged to 4.3 V, and a constant voltage (CV) condition was applied at 4.3V after charging, where the stop condition was 0.05 C, and the secondary battery was discharged to 2.7 V at constant current condition. The C-rate was 0.1 C during the formation charge/discharge. In order to evaluate the self-discharge, charging was performed once more at room temperature. The charging condition was the same as that of the formation charge, and the open circuit voltage (OCV) of the cell was measured.

Referring to FIG. 5c, it can be seen that the open circuit voltage decrease of the secondary battery according to Example 1 is smaller than that of the secondary battery according to Comparative Example 1-2, and thus, it can be seen that the high temperature lifespan storage performance is excellent.

Through this, the secondary containing lithium tetrafluoro (2-fluoromalonato)phosphate (LiFMTFP) compared to tetrafluoro(oxalato)phosphate (LiPF$_4$(C$_2$O$_4$), LiTFOP) and fluoroethylenecarbonate (FEC) has excellent discharge capacity, coulombic efficiency, and lifespan storage performance at high temperatures, so it can exhibit improved lifespan characteristics at high temperatures. Therefore, when the electrolyte additive according to the present inventive concept is included, the lifespan may be excellent even in a secondary battery that generates a lot of heat, so it may be suitable for use in a medium or large-sized battery.

Figure 6:
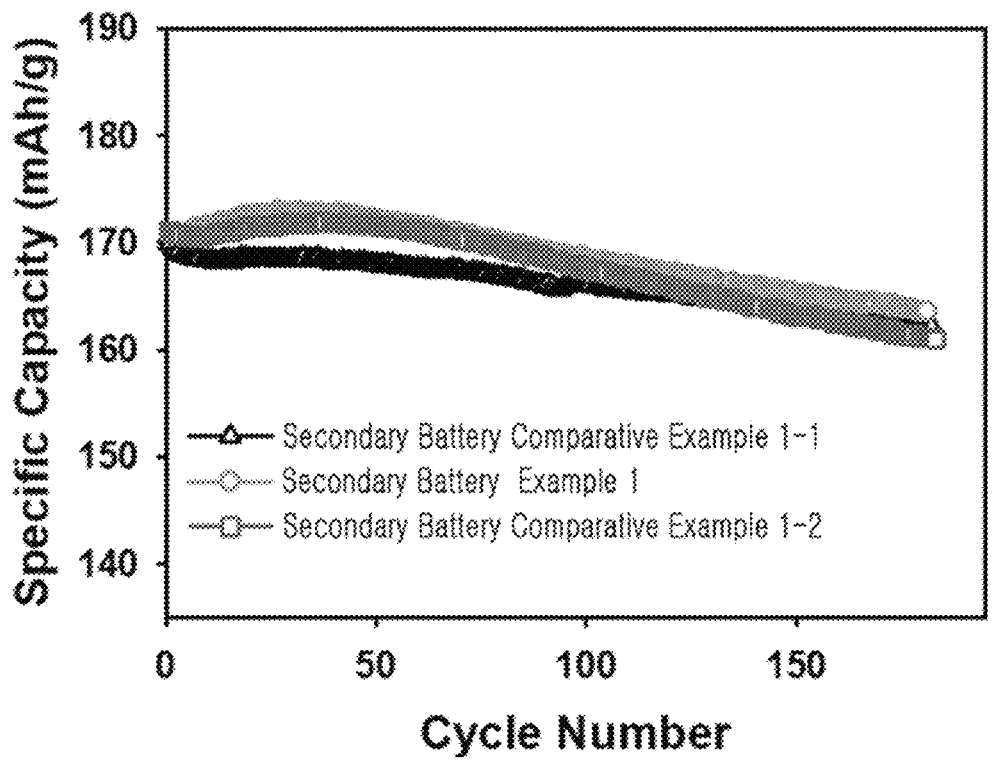
FIG. 6 is a graph showing specific discharge capacity according to the number of cycles at room temperature for secondary batteries according to Secondary Battery Example 1 and Secondary Battery Comparative Examples 1-1 and 1-2.

FIG. 6 is a graph showing specific discharge capacity according to the number of cycles at room temperature for secondary batteries according to Secondary Battery Example 1 and Secondary Battery Comparative Examples 1-1 and 1-2.

Room temperature life characteristics were evaluated after one formation charge and discharge for each secondary battery. In detail, during one-time formation charge/discharge, each secondary battery was charged to 4.3 V, and a constant voltage (CV) condition was applied at 4.3 V after charging, where the stop condition was 0.02 C, and the secondary battery was discharged to 2.7 V at constant current condition. The C-rate during formation charging and discharging was 0.1 C.

After the one-time formation charging and discharging, in order to secure life stability before evaluating the room temperature life characteristics, charging and discharging were additionally performed three times. Specifically, each secondary battery was charged to 4.3 V, a constant voltage condition (CV) was applied at 4.3 V after charging, where the stop condition was 0.05 C, and the secondary battery was discharged to 2.7 V at constant current condition. At this time, the C-rate was 0.2 C.

In the room temperature lifespan evaluation, each secondary battery was charged to 4.3 V at 25° C., and a constant voltage (CV) condition was applied at 4.3 V after charging, where the stop condition was 0.05 C, and the secondary battery was discharged to 2.7V at constant current condition. The C-rate was 1.0 C during the lifespan evaluation. At this time, the charging and discharging experiments were performed up to approximately 200 cycles.

Referring to FIG. 6, although there is no difference in the initial capacity depending on the electrolytes, the secondary battery according to Secondary Battery Example 1 has improved specific discharge capacity value compared to the secondary batteries according to Secondary Battery Comparative Examples 1-1 and 1-2 at the final cycle. Accordingly, a secondary battery containing lithium tetrafluoro (2-fluoromalonato)phosphate (LiFMTFP) compared to tetrafluoro (oxalato)phosphate (LiPF$_4$(C$_2$O$_4$), LiTFOP) and fluoroethylene carbonate (FEC) may have better room temperature lifespan performance.

As described above, by adding the electrolyte additive according to the present inventive concept alone as an electrolyte additive in the electrolyte composition, even when an additional electrolyte additive such as a coating agent is not further added, the stability of the electrode interface is improved, and the secondary battery including the same may exhibit excellent electrochemical properties.

Secondary Battery Example 2

Li$_{1.17}$Ni$_{0.17}$Mn$_{0.5}$Co$_{0.17}$O$_2$ as a lithium-rich cathode active material, a binder (PVDF), and a conductive material (Super P) were uniformly mixed at weight ratio of 8:1:1 (cathode active material: conductive material: binder) in n-methyl-2-pyrrolidone (NMP) solvent. A cathode was prepared by uniformly applying the mixture containing the lithium-rich cathode active material to an aluminum (Al) current collector, pressing it in a roll press, and vacuum drying it in a vacuum oven at 110° C. for 2 hours. Here, the electrode density was set to have 1.9 g/cc.

An anode active material layer was formed using a silicon-graphite composite as an anode active material. In addition, a polyethylene separator between the prepared cathode and anode was put into a battery container, and the electrolyte prepared according to Electrolyte Example 2 was disposed between the cathode active material layer and the anode active material layer to manufacture a lithium secondary battery in the form of a 2032 full-cell according to a conventional manufacturing method.

Secondary Battery Comparative Example 2-1

A lithium secondary battery was prepared in the same manner as in Secondary Battery Example 2, except that the electrolyte prepared according to Electrolyte Comparative Example 2-1 was used instead of the electrolyte prepared according to Electrolyte Example 2 as the electrolyte.

Secondary Battery Comparative Example 2-2

A lithium secondary battery was prepared in the same manner as in Secondary Battery Example 2, except that the electrolyte prepared according to Electrolyte Comparative Example 2-2 was used instead of the electrolyte prepared according to Electrolyte Example 2 as the electrolyte.

Figure 7A:
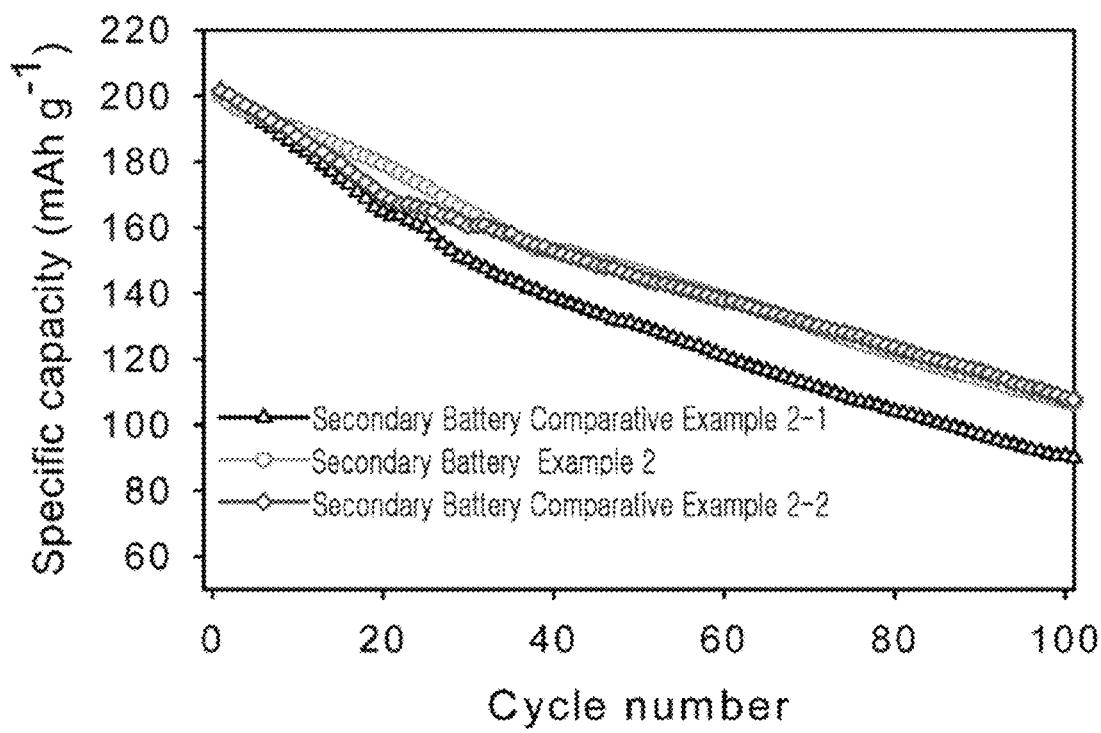
FIGS. 7a-7b are graphs illustrating room temperature lifespan characteristics of secondary batteries according to Secondary Battery Example 2 and Secondary Battery Comparative Examples 2-1 and 2-2. In particular.
Figure 7B:
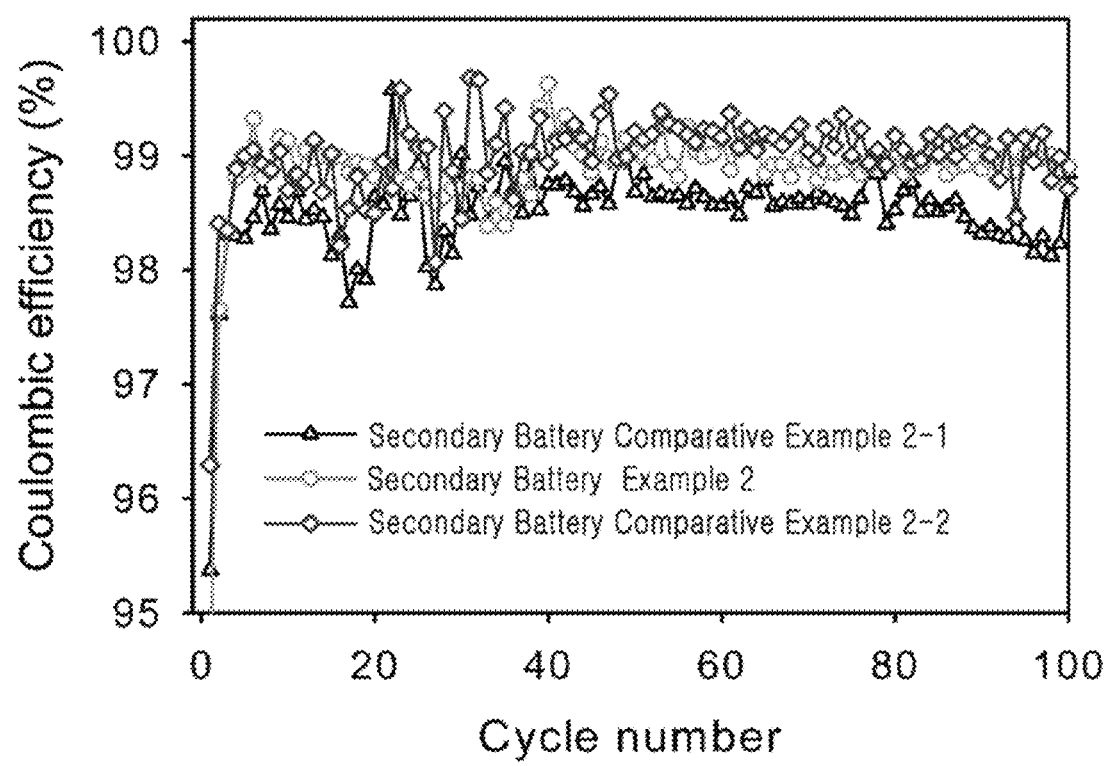

FIG. 7 is a graph illustrating room temperature lifespan characteristics of secondary batteries according to Secondary Battery Example 2 and Secondary Battery Comparative Examples 2-1 and 2-2. FIG. 7a is a graph showing specific capacity according to the number of cycles, and FIG. 7b is a graph showing the coulombic efficiency according to the number of cycles.

The room temperature lifespan characteristics were evaluated after one formation charge/discharge for each secondary battery. In detail, during one formation charge/discharge, each secondary battery was charged to 4.55 V, and a constant voltage (CV) condition was applied at 4.55 V after charging, where the stop condition was 0.02 C, and the secondary battery was discharged to 2.0 V at constant current condition. The C-rate was 0.1 C during the formation charge/discharge.

After the one-time formation charging and discharging, in order to secure life stability before evaluating the room temperature life characteristics, charging and discharging were additionally performed three times. Specifically, each secondary battery was charged to 4.55 V, a constant voltage condition (CV) was applied at 4.55 V after charging, where the stop condition was 0.05 C, and the secondary battery was discharged to 2.0 V at constant current condition. At this time, the C-rate was 0.2 C.

In the room temperature lifespan evaluation, each secondary battery was charged to 4.55 V at 25° C., and a constant voltage (CV) condition was applied at 4.55 V after charging, where the stop condition was 0.05 C, and the secondary battery was discharged to 2.0 V at constant current condition. The C-rate was 0.5 C during the lifespan evaluation, and the charging and discharging experiments were performed up to approximately 100 cycles.

Referring to FIG. 7a, although there is no difference in the initial capacity depending on the electrolyte, it can be seen that there is a difference in the degree of capacity degradation according to the increase in the number of cycles and the specific discharge capacity in the final cycle. In other words, compared to other secondary batteries, the secondary battery according to Secondary Battery Comparative Example 2-1 exhibits a large degree of capacity degradation and has a small specific discharge capacity at $100^{th}$ cycle. Compared to the secondary battery according to Secondary Battery Comparative Example 2-2, the secondary battery according to Secondary Battery Example 2 showed similar specific discharge capacity values at $100^{th}$ cycle, but had a higher specific discharge capacity value at approximately $20^{th}$ cycle. Therefore, it can be seen that the secondary battery including the electrolyte additive according to the present inventive concept has excellent cycle capacity retention and initial lifespan characteristics.

Also, referring to FIG. 7b, it can be seen that the secondary batteries have no problem in performing 100 cycles, but the average coulombic efficiency value is different depending on the electrolyte contained in the secondary battery. It can be seen that the coulombic efficiency of the secondary battery according to Secondary Battery Example is more stable than that of the secondary battery according to the Secondary Battery Comparative Examples.

Therefore, as described above, a secondary battery containing lithium tetrafluoro(2-fluoromalonato)phosphate (LiFMTFP) compared to tetrafluoro(oxalato)phosphate (LiPF$_4$(C$_2$O$_4$), LiTFOP) has excellent discharge capacity and coulombic efficiency at room temperature, so it can exhibit excellent lifespan characteristics at room temperature.

Figure 8:
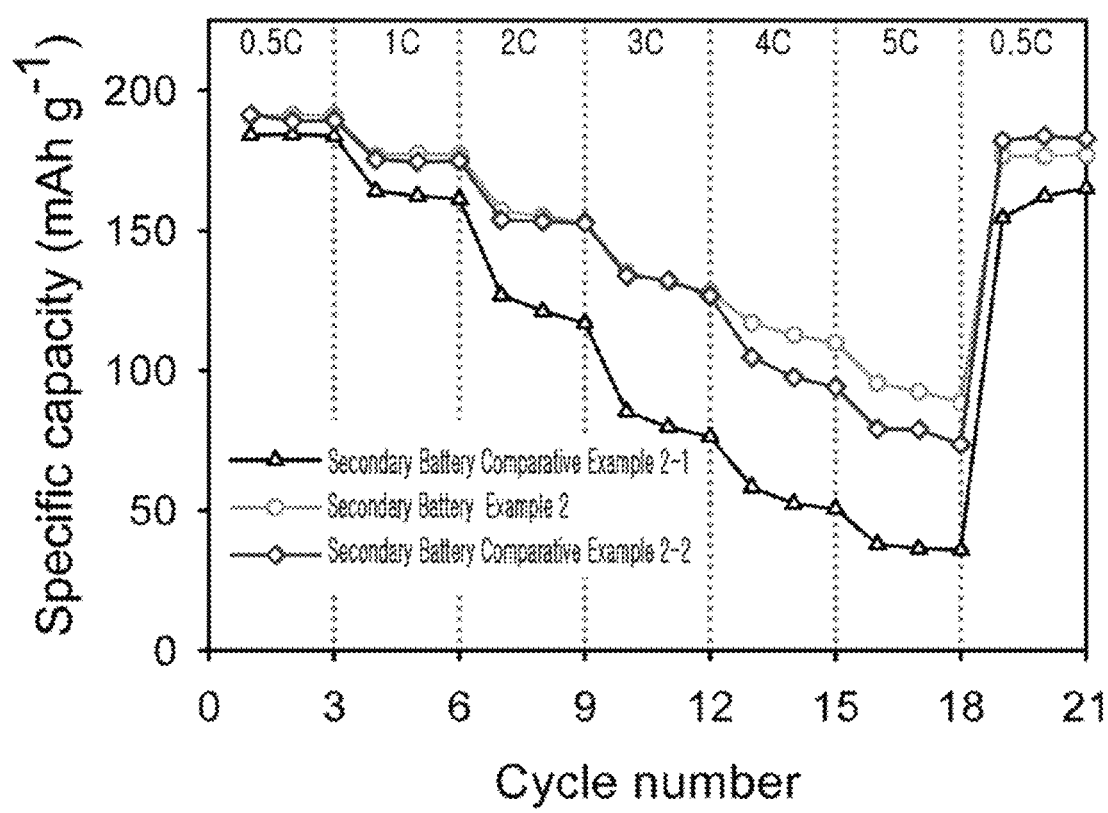
FIG. 8 is a graph showing high-rate discharge characteristics of secondary batteries according to Secondary Battery Example 2 and Secondary Battery Comparative Examples 2-1 and 2-2.

FIG. 8 is a graph showing high-rate discharge characteristics of secondary batteries according to Secondary Battery Example 2 and Secondary Battery Comparative Examples 2-1 and 2-2.

For each secondary battery, after one formation charge/discharge at 25° C., the charge rate is fixed at 0.5 C, and the discharge rate is changed to 0.5 C, 1 C, 2 C, 3 C, 4 C, 5 C, and 0.5 C, resulting in high-rate discharge characteristics was evaluated. Evaluation was carried out for each 3 cycles of each discharge rate.

Referring to FIG. 8, it can be confirmed that the secondary battery has an operability despite the current density ranging from 0.5 C-rate to 5 C-rate, and it can be seen that decrease of the specific discharge capacity of other secondary batteries is smaller than the secondary battery according to Secondary Battery Comparative Example 2-1 despite the high current density. Furthermore, the secondary battery according to the Secondary Battery Example compared to the secondary battery according to Secondary Battery Comparative Example 2-2 has no significant difference in 0.5 C-rate to 3 C-rate, but it can be seen that there is a slight difference between the specific discharge capacity under the current densities of 4 C-rate and 5 C-rate.

Therefore, the high rate charge and discharge characteristics of the electrolyte containing lithium tetrafluoro(2-fluoromalonato)phosphate (LiFMTFP) compared to tetrafluoro(oxalato)phosphate (LiPF$_4$(C$_2$O$_4$), LiTFOP) were improved. Therefore, it can be seen that the secondary battery according to an embodiment of the present inventive concept may have excellent high-rate discharge characteristics at room temperature and excellent lifespan stability against C-rate changes.

Figure 9:
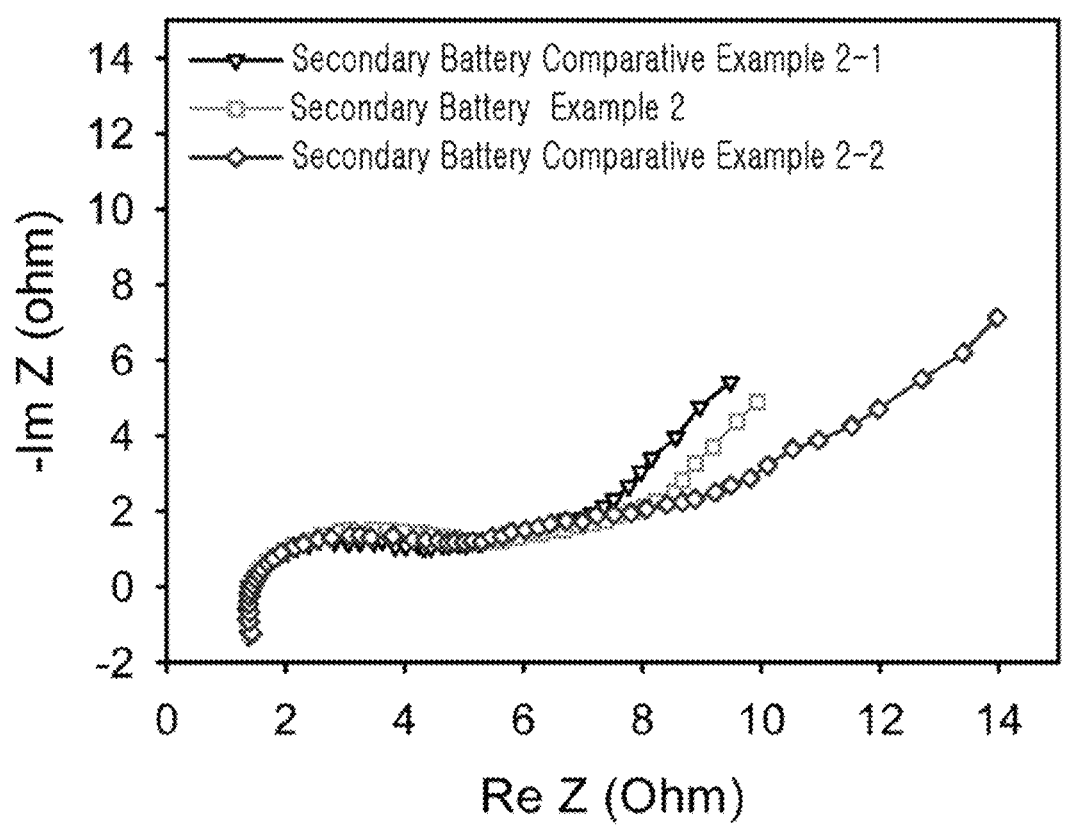
FIG. 9 is a graph showing the impedance of the interface between an electrode and an electrolyte with respect to the secondary batteries according to Secondary Battery Example 2 and Secondary Battery Comparative Examples 2-1 and 2-2.

FIG. 9 is a graph showing the impedance of the interface between an electrode and an electrolyte with respect to the secondary batteries according to Secondary Battery Example 2 and Secondary Battery Comparative Examples 2-1 and 2-2.

The interfacial resistance was measured after the formation process of each secondary battery. Specifically, during one-time formation charge/discharge, each secondary battery was charged to 4.55 V, and a constant voltage (CV) condition was applied at 4.55 V after charging where the stop condition was 0.02 C, and the secondary battery was discharged to 2.0 V at constant current condition. Here, the C-rate of was 0.1 C.

Referring to FIG. 9, it can be predicted that the internal resistance of the secondary battery also increases as the interfacial resistance between the electrode and the electrolyte in the secondary battery according to Secondary Battery Example slightly increases compared to Secondary Battery Comparative Examples 2-1 and 2-2. This is considered to be because a film is formed in the initial stage of the electrode.

As described above, when the electrolyte additive according to the present inventive concept is mixed with the coating agent, a uniform and stable protective film can be generated by the coating agent on the electrode of the secondary battery including the same, and thereafter, the already formed protective film and the electrode are protected by the electrolyte additive according to the present inventive concept, so that the interface between the electrode and the electrolyte can be stabilized.

In the above, the present inventive concept has been described in detail with reference to preferred embodiments, but the present inventive concept is not limited to the above embodiments, and various modifications and changes by those skilled in the art is possible within the spirit and scope of the present inventive concept.

The invention claimed is:

1. An electrolyte additive represented by Chemical Formula 2 below:

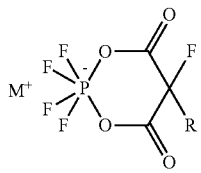

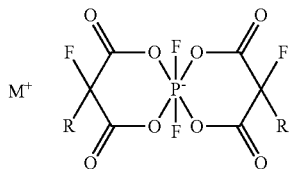

[Chemical Formula 2]

wherein M is alkali metal, and

R is hydrogen, a substituted or unsubstituted C1 to C5 alkyl group, a substituted or unsubstituted C1 to C5 perfluoroalkyl group, a substituted or unsubstituted C6 to C30 aryl group, a substituted or unsubstituted C6 to C30 perfluoroaryl group, or $CF_3$.

2. The electrolyte additive of claim 1, wherein the electrolyte additive of Chemical Formula 2 is represented by the following Chemical Formula 4:

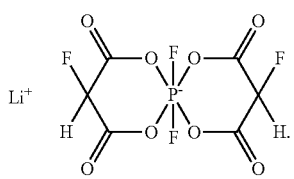

[Chemical Formula 4]

3. A method of manufacturing an electrolyte additive comprising:

a step of reacting hexafluorophosphate and 2-monofluoromalonic acid;

a step of adding a HF scavenger to a mixed solution produced by the reaction; and a step of concentrating and drying the solution obtained from the above to prepare a compound represented by Chemical Formula 1 or Chemical Formula 2 below:

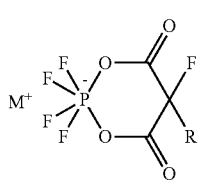

[Chemical Formula 1]

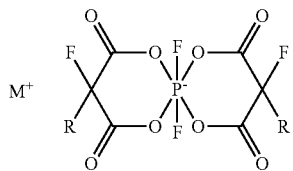

[Chemical Formula 2]

wherein M is alkali metal, and

R is hydrogen, a substituted or unsubstituted $C_1$ to $C_5$ alkyl group, a substituted or unsubstituted $C_1$ to $C_5$ perfluoroalkyl group, a substituted or unsubstituted C6 to C30 aryl group, a substituted or unsubstituted C6 to C30 perfluoroaryl group, or $CF_3$.

4. The method of claim 3, wherein the hexafluorophosphate includes lithium hexafluorophosphate ($LiPF_6$).

5. The method of claim 3, further comprising:

a step of preparing the 2-monofluoromalonic acid by reacting 2-monofluoromalonic acid ester with an acid solution before reacting the hexafluorophosphate and the 2-monofluoromalonic acid.

6. The method of claim 5, further comprising:

a step of drying the reaction-completed solution using a dehydrating agent in the step of preparing the 2-monofluoromalonic acid.

7. The method of claim 6, wherein the dehydrating agent includes orthoesters of $R^1C(OR^2)_3$ in which $R^1$ is hydrogen or a C1 to C5 alkyl group, $R^2$ is a C1 to C5 alkyl group, and $R^1$ and $R^2$ are independently selected.

8. The method of claim 3, wherein the step of reacting the hexafluorophosphate and the 2-monofluoromalonic acid is performed in a non-aqueous organic solvent.

9. The method of claim 3, wherein the step of reacting the hexafluorophosphate and the 2-monofluoromalonic acid is carried out at a reaction temperature of 5 to 60° C.

10. The method of claim 3, wherein the HF scavenger includes a halide, a silane compound, or a combination thereof.

11. The method of claim 10, wherein the halide includes an alkali metal halide, a silicon halide, a phosphorus halide, or a combination thereof.

12. The method of claim 10, wherein the halide includes lithium chloride, silicon tetrachloride, dichlorodimethylsilane, chlorotrimethylsilane, phosphorus trichloride, or a combination thereof.

13. The method of claim 10, wherein the silane compound includes an acyclic silane compound, a cyclic silane compound, or a combination thereof.

14. The method of claim 3, wherein the step of concentrating and drying the reaction solution obtained from the above is performed under reduced pressure.

15. An electrolyte composition comprising:

an electrolyte additive;

a non-aqueous organic solvent; and an alkali salt, wherein the electrolyte additive includes a compound represented by Chemical Formula 2 below:

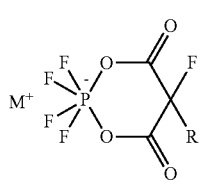

[Chemical Formula 2]

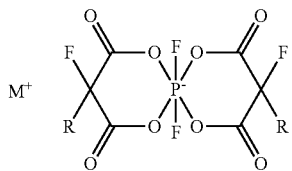

wherein M is alkali metal, and

R is hydrogen, a substituted or unsubstituted C1 to C5 alkyl group, a substituted or unsubstituted C1 to C5 perfluoroalkyl group, a substituted or unsubstituted C6 to C30 aryl group, a substituted or unsubstituted C6 to C30 perfluoroaryl group, or $CF_3$.

16. The electrolyte composition of claim 15, wherein the electrolyte additive is included in an amount of 0.1 to 10% by weight based on the total amount of the electrolyte composition.

17. The electrolyte composition of claim 15, wherein the electrolyte additive is a mixture of the electrolyte additive of Chemical Formula 2 and a coating agent.

18. The electrolyte composition of claim 17, wherein the coating agent includes fluoroethylene carbonate (FEC), vinylene carbonate (VC), vinylethylene carbonate (VEC), or a combination thereof.

19. The electrolyte composition of claim 15, wherein the non-aqueous organic solvent includes a cyclic carbonate, a linear carbonate, or a combination thereof.

20. The electrolyte composition of claim 19, wherein the non-aqueous organic solvent includes ethylene carbonate (EC), dimethyl carbonate (DMC), ethylmethyl carbonate (EMC), or a combination thereof.

21. The electrolyte composition of claim 15, wherein the alkali salt includes $MPF_6$, $MASF_6$, $MCF_3SO_3$, $MN(CF_3SO_2)_2$, $MBF_4$, $MBF_6$, $MSbF_6$, $MN(C_2F_5SO_2)_2$, $MAlO_4$, $MAlCl_4$, $MSO_3CF_3$, $MClO_4$, or a combination thereof, wherein M is an alkali metal.

22. The electrolyte composition of claim 15, wherein a concentration of the alkali salt is 0.1 to 3M.

23. A secondary battery comprising:
a cathode containing a cathode active material;
an anode containing an anode active material; and
an electrolyte containing an electrolyte additive represented by Chemical Formula 2 below:

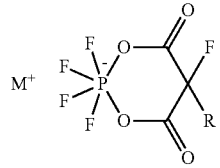

[Chemical Formula 2]

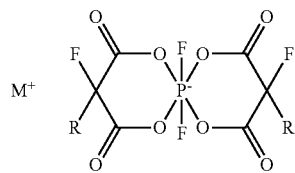

wherein M is alkali metal, and

R is hydrogen, a substituted or unsubstituted C1 to C5 alkyl group, a substituted or unsubstituted C1 to C5 perfluoroalkyl group, a substituted or unsubstituted C6 to C30 aryl group, a substituted or unsubstituted C6 to C30 perfluoroaryl group, or $CF_3$.

24. The secondary battery of claim 23, wherein the cathode active material includes $LiNi_{0.6}Co_{0.2}Mn_{0.2}O_2$.

25. The secondary battery of claim 23, wherein the cathode active material includes a lithium-rich cathode active material.

26. The secondary battery of claim 23, wherein the anode active material includes graphite or a silicon-graphite composite.

* * * * *